US008803884B2

(12) United States Patent
Bradshaw et al.

(10) Patent No.: US 8,803,884 B2
(45) Date of Patent: Aug. 12, 2014

(54) EVENT DATA VISUALIZATION TOOL

(75) Inventors: Jeffrey M. Bradshaw, Pace, FL (US);
Lawrence K. Bunch, Gulf Breeze, FL (US); Marco M. Carvalho, Satellite Beach, FL (US); Thomas C. Eskridge, Gulf Breeze, FL (US); Paul J. Feltovich, Pensacola, FL (US); Matthew Johnson, Pensacola, FL (US)

(73) Assignee: Florida Institute for Human and Machine Cognition, Pensacola, FL (US)

( * ) Notice: Subject to any disclaimer, the term of this patent is extended or adjusted under 35 U.S.C. 154(b) by 407 days.

(21) Appl. No.: 13/404,784

(22) Filed: Feb. 24, 2012

(65) Prior Publication Data

US 2013/0222387 A1    Aug. 29, 2013

(51) Int. Cl.
*G06T 11/20*    (2006.01)

(52) U.S. Cl.
USPC .......................................... 345/440; 345/418

(58) Field of Classification Search
USPC ................... 345/440, 418; 709/224; 370/53; 714/47.3; 707/609
See application file for complete search history.

(56) References Cited

U.S. PATENT DOCUMENTS

| 8,479,057 | B2* | 7/2013 | Poletto et al. ................ 714/47.3 |
| 2005/0152378 | A1* | 7/2005 | Bango et al. .................. 370/400 |
| 2007/0074288 | A1* | 3/2007 | Chang et al. ..................... 726/22 |
| 2009/0171976 | A1* | 7/2009 | Obara et al. ..................... 707/10 |
| 2010/0214947 | A1* | 8/2010 | Dimitropoulos et al. ..... 370/253 |

* cited by examiner

*Primary Examiner* — Chante Harrison
(74) *Attorney, Agent, or Firm* — J. Wiley Horton

(57) ABSTRACT

A method for visually depicting complex events. Software agents are preferably employed to assist the human operator by collecting, enriching, selecting, aggregating, and analyzing data so that patterns of interest can be visually flagged or otherwise emphasized in the visual display. Events are depicted as an "event flow" from a source surface to a destination surface. Intervening surfaces may also be defined. The point of origin on the source surface reveals some information about the event flow, as does the point of impact on the destination surface. The event flow may be mapped to one or more intervening surfaces in order to visually depict other characteristics of the event. The entire depiction is rendered in a simulated three-dimensional view. The user is preferably given the ability to pan, zoom, and reorient the vantage point from which the user "views" the depiction on the computer display.

30 Claims, 24 Drawing Sheets

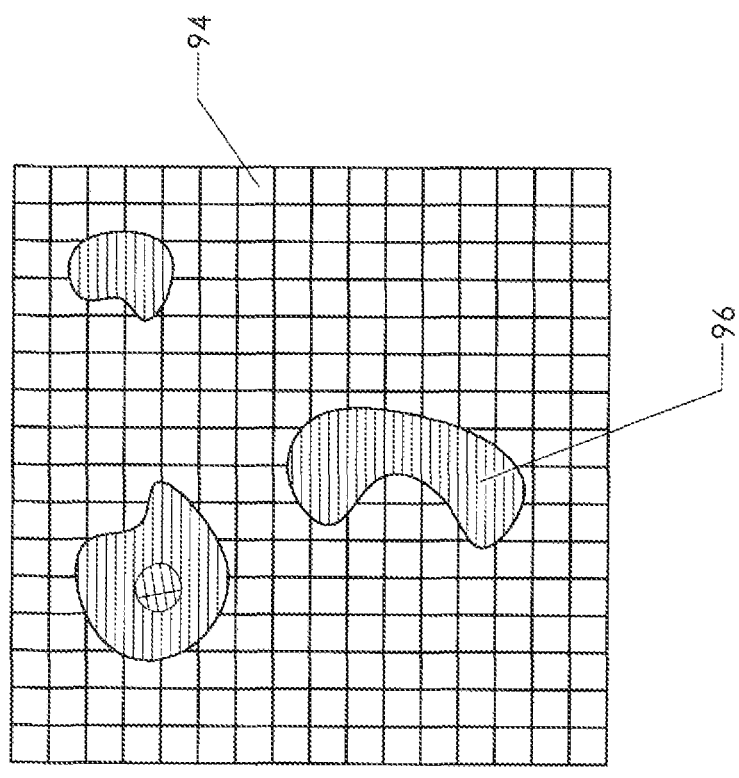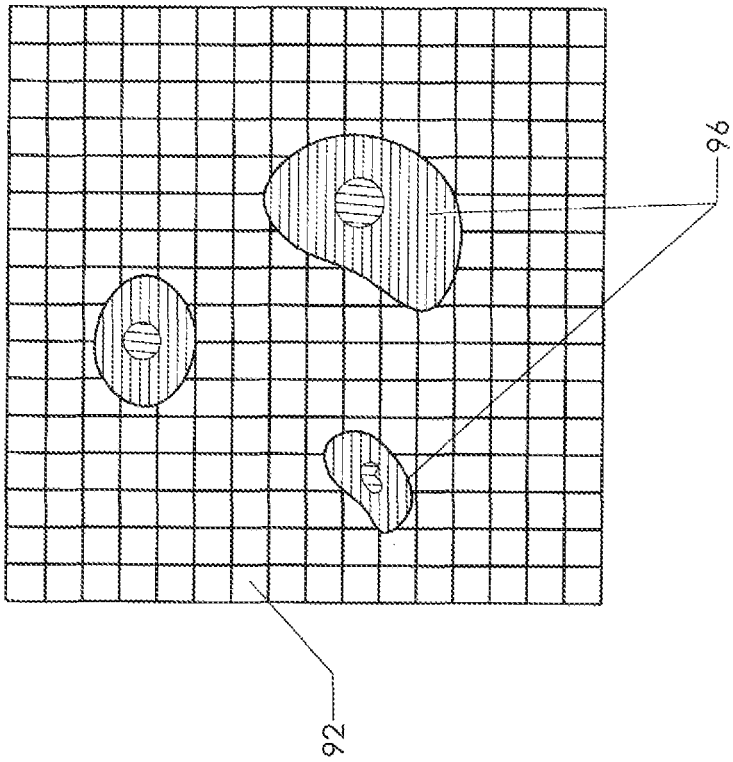
FIG. 20

EVENT DATA VISUALIZATION TOOL

STATEMENT REGARDING FEDERALLY SPONSORED RESEARCH OR DEVELOPMENT

This work has been sponsored by U.S. Department of Defense Contract #H98230-09-C-0357.

CROSS-REFERENCES TO RELATED APPLICATIONS

Not Applicable.

MICROFICHE APPENDIX

Not Applicable

BACKGROUND OF THE INVENTION

1. Field of the Invention

This invention relates to the field of visualization tools. More specifically, the invention comprises a method for visually depicting events in a way that allows one or more users operating in conjunction with software agents to quickly discern significant patterns from a much larger amount of information, and for these users to interact with software agents and the visual depiction in order to further refine the visual depiction.

2. Description of the Related Art

The present invention is useful in visually depicting a large number of events in a way that allows a user or users to intuitively focus on a subset of those events which is of interest. The invention has many applications—including the fields of Internet communication, telecommunications, physical traffic flow (such as motor vehicle congestion patterns or package deliveries), financial transactions, tracking the spread of human pathogens, disaster management, and other complex phenomena. A specific embodiment of the invention is a tool for depicting Internet traffic. As many of the examples described in the following disclosure pertain to this particular embodiment, some background information concerning Internet data traffic will aid the reader's understanding.

The monitoring and analysis of Internet traffic is an area of increasing interest. This field is useful for purposes of anti-terrorism, anti-crime, and counterintelligence activities—among others. Communication across the Internet must originate at a specific network location and it must terminate at a specific network location or locations. Network addresses are currently set according to Internet Protocol Version 4 ("IPv4"), which is a standard promulgated by the Internet Engineering Task Force ("IETF"). The reader should be aware that IETF is currently developing replacement standard (s) for IPv4. However, as IPv4 is currently the standard it will be used throughout this document. The methods disclosed are equally applicable to successor standards (such as IPv6) and the use of IPv4 in the explanations given should not be viewed as limiting.

IPv4 specifies a standard format for an Internet address. A dot-decimal notation is used having the format "n.n.n.n" where each "n" represents a number between 0 and 255. The following are exemplary network addresses using this notation scheme:

192.0.120.24
255.124.124.6
12.122.132.204

Each of these numerical sequences defines a unique network location within the Internet. Each individual number "n" is often referred to as an "octet" since it encompasses eight bits of the 32-bit address. The IPv4 format provides a total of approximately 4.2 billion possible individual addresses.

Data being exchanged over the Internet originates at an IPv4 address and terminates at an IPv4 address. Thus—using the exemplary addresses from above—a stream of data could originate at 192.0.120.24 and terminate at 255.124.124.6. The authenticity of the source address is not currently verified in most data exchange protocols. This can be an issue—as will be explained in the description of the present invention.

Systems exist for monitoring traffic on the Internet. These systems provide information such as the total communication event flow rate, communication event as a function of specific Web ports, and so forth. A common protocol for monitoring traffic is the "NetFlow" protocol developed by Cisco Systems, Inc. of California (CISCO® is a trademark commonly used by Cisco Systems, Inc.). NetFlow has become a de facto industry standard that is supported by platforms other than Cisco's IOS and NXOS. It is anticipated that the NetFlow protocol will shortly be superseded by the Internet Flow Information eXport ("IPFIX") protocol. However, the principles to be disclosed herein are equally applicable to any successor protocol and NetFlow serves as an appropriate example.

The NetFlow traffic monitoring protocol typically provides the following properties for each exchange of information between two computers (sometimes referred to as a "communication event" or "message") occurring on the Internet:

(1) Date and time;
(2) Duration of the information exchange;
(3) Source Internet Protocol ("IP") address (such as 192.0.120.24);
(4) Destination IP address (such as 255.124.124.6);
(5) IP protocol (such as UDP, TCP, BGP, and ICMP);
(6) Source port for UDP or TCP protocols (a "0" is used for other protocols);
(7) Destination port for UDP or TCP, type and code for ICMP (a "0" is again used for other protocols);
(8) Number of bytes of data transferred;
(9) Number of packets the data was divided into for transfer; and
(10) IP type of service.

Although the terms used in this list of NetFlow properties are familiar to those skilled in the art, some explanation may be helpful to the reader. The term "source port" refers to the port used by the originating computer (more explanation on the meaning of the term "port" is given subsequently). The "destination port" is the port used by the destination computer. The "IP protocol" (an internally redundant phrase) refers to the type of protocol used in the communication event (such as UDP or TCP). The "IP type of service" can refer to different things but has traditionally referred to a request by the sender as to how the data packet should be handled (such as a preference for speed over reliability).

The two most common Internet data transfer protocols are UDP and TCP. "TCP" stands for Transmission Control Protocol. "UDP" stands for User Datagram Protocol. TCP establishes a source-to-destination connection that remains intact throughout the data transfer. In contrast, UDP sends messages without establishing a source to destination connection.

Under either protocol, the destination computer receives information using a "port." Each IP address has many ports. Under IPv4, each IP address has 65,535 ports. Data is sent to a specific IP address and a specific port on that IP address.

Ports are roughly analogous to channels on a radio or television. They are significant in the present context because certain ports are associated by convention with certain applications. Some examples may be helpful. As those skilled in the art will know, a Web server is a computer running an application which allows other computers to connect to it and retrieve information (typically though not always Web pages) stored on the Web server. In order for the Web server to accept remote connections, it must bind the particular Web server application to a local port. The server will then use this local port to "listen" for and accept connections from remote computers.

By convention, Web servers typically bind Web applications to TCP Port 80. This port is the default setting under the hypertext transfer protocol ("http"). Thus, the Web server will typically "listen" on TCP Port 80 since that is the port used by external computers seeking to access Web pages.

The process is different from the perspective of the remote computer seeking to access the Web server. Access is usually made via an application (such as a Web browser or a Web app) running on the remote computer. The Web browser picks a random TCP port from a defined range of port numbers and attempts to connect to TCP Port 80 on the IP address of the Web server. The Web browser will then send a request for a particular Web page.

Another example is a File Transfer Protocol ("FTP") server, which is a server configured to transfer and receive files from remote computers (Note that a single computer could simultaneously act as a Web server and an FTP server). By convention, FTP servers use TCP Port 20 and Port 21. Thus, when the FTP application starts it will be bound to Port 20 or 21. It will not interfere with the Web server application bound to Port 80 (other than by diminishing the available data transmission capacity).

The specific port assignments are generally set by the IANA Registry (a registry managed by the Internet Assigned Numbers Authority). Software developers register the ports their applications use with IANA. This convention greatly reduces the chance of a port conflict.

In the present context, the IANA Registry allows network communication events to be categorized in useful ways. For example, if one wishes to observe "request events" directed to Web server applications, one would naturally want to look at messages bound to TCP Port 80. This type of information is readily available in the NetFlow protocol.

All Internet traffic is directed to its destination through a series of special-purpose computers called routers, such as those manufactured by Cisco Systems, Inc. The owner of a router can configure it to produce Netflow records about the network traffic that flows through that router. Each NetFlow record contains properties that describe a single communication event. These Netflow records can be transmitted to other computers to provide a live view of the traffic currently being handled by that router. Collections of NetFlow or similar data aggregated from multiple routers worldwide are publicly available from sources such as CAIDA (Cooperative Association for Internet Data Analysis). By analyzing the NetFlow data, a picture of traffic flow and volume in a network can be obtained. It is in theory possible to obtain an overall picture for the entire Internet. However, the volume of data existing at any point in time can be overwhelming. Conventional techniques for displaying such data make it very difficult for a user to obtain the "big picture."

One existing visual depiction that has been applied to network flow events is a "parallel coordinates graph." This type of visualization consists of a two-dimensional plot of events—often flowing from left to right. A parallel coordinates graph may be presented for data flow through a network host. External senders are plotted vertically on the left side of the graph, internal hosts are plotted vertically in the center, and external receivers are plotted vertically on the right. When data is sent, a line is plotted between the sender, the host, and the receiver. A parallel coordinates graph shows many such lines as data is sent.

Such a plot is easy to use in a low-volume small network situation. They are impractical for large networks, however, and certainly impractical for a depiction of the Internet as a whole. Even with large or multiple screens, clutter from overlapping connection lines in larger networks often becomes unreadable.

On the other hand, one of the defining characteristics of the human mind is its ability to intuitively discern patterns and changes in patterns—even for very complex events. This capability exists despite the inability to rationally define the steps in a pattern or process. The present invention seeks to take advantage of this innate human capability by graphically depicting events (such as communication events on the Internet) in a way that makes pattern spotting and evaluation possible. Software agents are used to aggregate, correlate, and analyze data and patterns of data in ways that emphasize events that may be of interest. The data are then visually presented to a human operator who is given tools to alter both the depiction itself and the activities of the software agents in order to focus on areas of particular interest.

BRIEF SUMMARY OF THE INVENTION

The present invention provides a method for visually depicting complex events. Software agents are preferably employed to assist the human operator by aggregating, correlating, and analyzing events in a way that allows a subset of specific data to be emphasized in the visual display. Events are depicted as an "event flow" from a source surface to a destination surface. Intervening surfaces may also be defined.

The point of origin on the source surface reveals some information about the event flow, as does the point of impact on the destination surface. The event flow may be mapped to one or more intervening surfaces in order to visually depict other characteristics of the event. The entire depiction is rendered in a simulated three-dimensional view. The user is preferably given the ability to pan, zoom, and reorient the vantage point from which the user "views" the depiction on the computer display. The user is preferably also given additional tools in order to group and manipulate the data flows depicted.

The source and destination surfaces are separated by a defined amount of time. Thus, the entire display presents a three-dimensional "cascade" of events moving from a first point in time to a second point in time. Users are thereby given the tools to rapidly and intuitively perceive shifting and developing patterns in the events depicted.

BRIEF DESCRIPTION OF THE SEVERAL VIEWS OF THE DRAWINGS

FIG. 20 is an embodiment showing still another alternate depiction of accumulated communication events over time.

Figure 1:
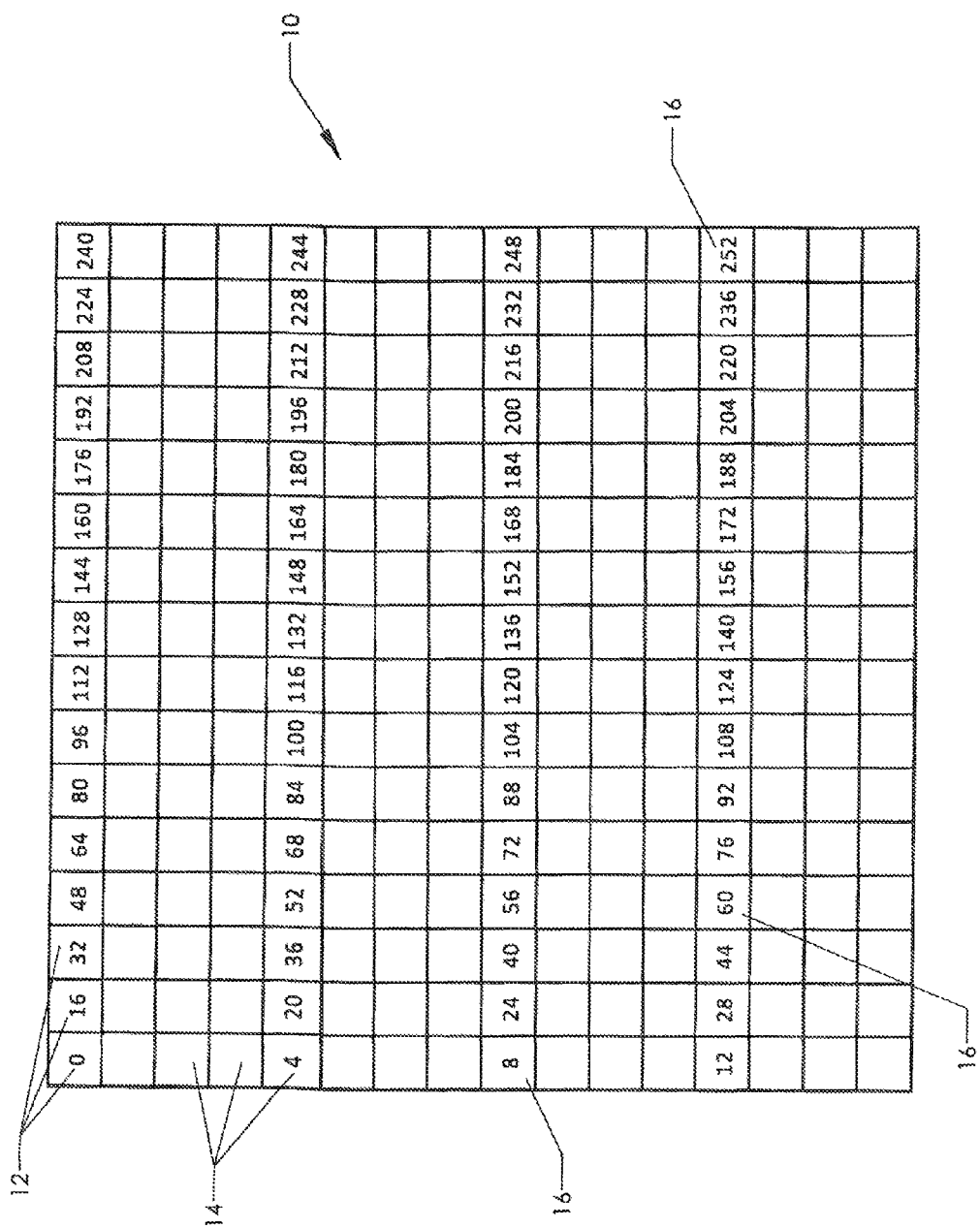
FIG. 1 is a plan view, showing the application of the present invention to computer communication events (a two dimensional grid display of Internet addresses).

| REFERENCE NUMERALS IN THE DRAWINGS | | | |
|---|---|---|---|
| 10 | IPv4 grid display | 12 | column |
| 14 | row | 16 | first octet label |
| 18 | first octet thirteen | 20 | first octet fourteen |
| 22 | first octet fifteen | 24 | second octet zero |
| 26 | second octet two hundred fifty-five | 28 | source map |
| 30 | destination map | 32 | flow path |
| 34 | event dart | 36 | separation |
| 38 | message size | 40 | event dart tail |

| REFERENCE NUMERALS IN THE DRAWINGS -continued | | | |
|---|---|---|---|
| 42 | event dart head | 44 | source color |
| 46 | destination color | 48 | port ring |
| 50 | port ring | 52 | geo-referenced source map |
| 54 | geo-referenced destination map | 56 | port ring |
| 58 | port ring | 60 | port ring |
| 62 | Mercator projection | 64 | point of origin |
| 66 | point of termination | 68 | first feature plane |
| 70 | second feature plane | 72 | first feature plot |
| 74 | second feature plot | 76 | linear feature plot |
| 78 | port ring cell | 80 | time bar |
| 82 | current time indicator | 84 | three-dimensional display |
| 86 | dart path | 88 | linear dart path |
| 90 | display controls | 92 | source accumulation map |
| 94 | destination accumulation map | 96 | data accumulation plot |
| 98 | data accumulation stalactite | 100 | data accumulation stalagmite |
| 102 | flag | 104 | trailing marker |
| 106 | highlight | 108 | selected destination map |
| 110 | non-selected destination map | 112 | selected source map |
| 114 | non-selected source map | 116 | blacklist source map |
| 118 | non blacklist source map | 120 | dart path direction indicator |

DETAILED DESCRIPTION OF THE INVENTION

The present invention is a visualization tool that functions best when human operators work in conjunction with software agents. The human mind has the innate ability to quickly assimilate a large number of visual primitives in order to discern a pattern. The invention exploits several human traits. First, it uses the human ambient vision system—the same system that allows people to quickly and successfully navigate crowded hallways without conscious thought. Second, the invention exploits the human visual ability to perceive changes using movement to convey complex, correlated information.

Of course, even people who use advanced visualization systems can be overwhelmed by too much data. The primary purpose of the software agents is to collect, aggregate, correlate, and analyze data that is likely to be significant to the human operator and bring it to the operator's attention. The interaction of the software agents and the human operator allow the operator to perceive and direct the characteristics of a complex system by studying the interactions of much simpler visual primitives.

The invention is generally referred to as a "Parallel Coordinates 3-Dimensional Observatory" ("PC3O" or "Observatory" for short). As explained initially, PC3O has many different applications and can be used to visually display a wide variety of complex phenomena. It is useful to the reader's understanding, however, to begin this description with a specific exemplary application. Once the reader has a thorough understanding of the exemplary application a more general description of the invention will be provided.

The selected exemplary application pertains to Internet communication events within a computer network. The network may vary in size, up to and including the entire Internet. Display software is provided on a computer. A set of information records describing communication events on the network in question is provided to the display software. A source map and a destination map are created. The source map is projected on a first surface and a destination map is projected on a second surface. The two surfaces are depicted on a computer display as being separated in space. The information describing the communication events is then depicted as one or more objects moving from the first surface to the second surface. The inventors refer to this embodiment as a "Flow Capacitor" since it is analogous to an electrical charge flowing from one plate of a parallel-plate capacitor to the other.

The Flow Capacitor depiction is created using display software running on a computer. The depiction is then presented on a display. A fundamental concept of the invention is that events (in this example Internet data) "flow" from a first surface (a "source map") to a second surface (a "destination" map).

For this particular embodiment, the source and destination maps are parallel coordinates. The visual depiction allows the user to selectively reorient the point of view in a simulated three-dimensional visualization.

For the Flow Capacitor example the source map can be used to represent the IPv4 addresses of the point of origin for each communication event. As explained previously, an IPv4 address follows the format n.n.n.n where each n represents a number between 0 and 255.

FIG. 1 shows a source map created from IPv4 addresses (IPv4 grid display 10). The grid includes sixteen columns 12 and sixteen rows 14. The grid therefore contains 256 "cells" which are numbered 0 through 255. Each cell shown in the grid corresponds to the first octet in the IPv4 address. It is preferable to label some of the cells in order to make a particular cell easier to find. First octet labels 16 are therefore included on every fourth cell.

Figure 2:
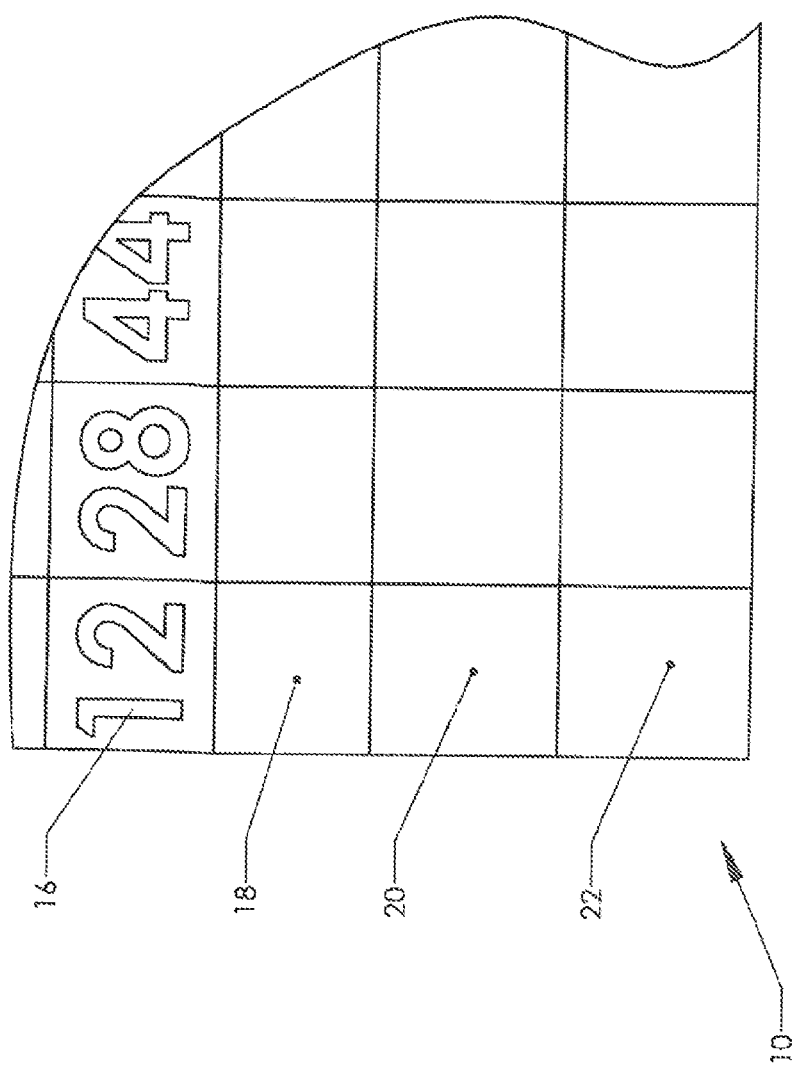
FIG. 2 is a detail view, showing a magnified portion of the grid of FIG. 1.

The reader will therefore understand that the cell in the upper left corner contains addresses conforming to 0.n.n.n while the cell in the lower right corner contains addresses conforming to 255.n.n.n. FIG. 2 shows an enlargement of the lower left corner of the grid of FIG. 1. The lower three cells are first octet thirteen (labeled as "18" in the view, and containing those addresses conforming to 13.n.n.n), first octet fourteen (labeled as "20" in the view, and containing those addresses conforming to 14.n.n.n), and first octet fifteen (labeled as "22" in the view, and containing those addresses conforming to 15.n.n.n). The reader should bear in mind that first octet fifteen is actually the sixteenth cell (the first column comprising cells zero through fifteen).

Figure 3:
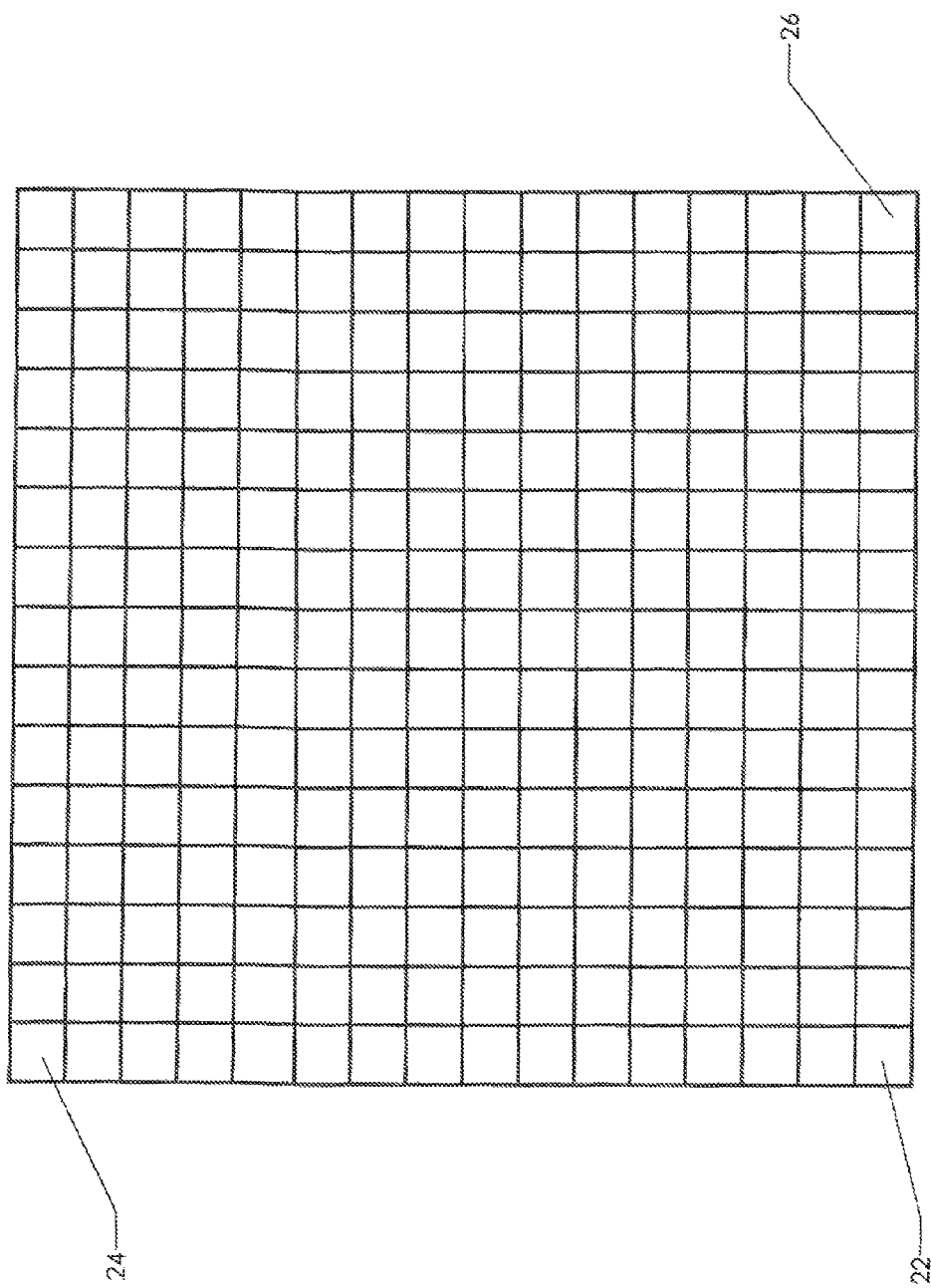
FIG. 3 is a detail view, showing a further magnification of the view of FIG. 2.

Each cell may be further subdivided according to the number in the second octet of the IPv4 address. FIG. 3 shows a further enlargement of first octet fifteen (labeled as "22" in the view). This cell may be further subdivided according to the portion of the address in the second octet, following the same format as used for the addresses in the first octet. The sub-cell in the upper left corresponds to second octet zero (labeled as "24" in the view). The sub-cell in the lower right corresponds to second octet two hundred fifty-five (labeled as "26"). Addresses in the sub-cell in the upper left conform to 15.0.n.n while addresses in the lower right conform to 15.255.n.n.

Figure 4:
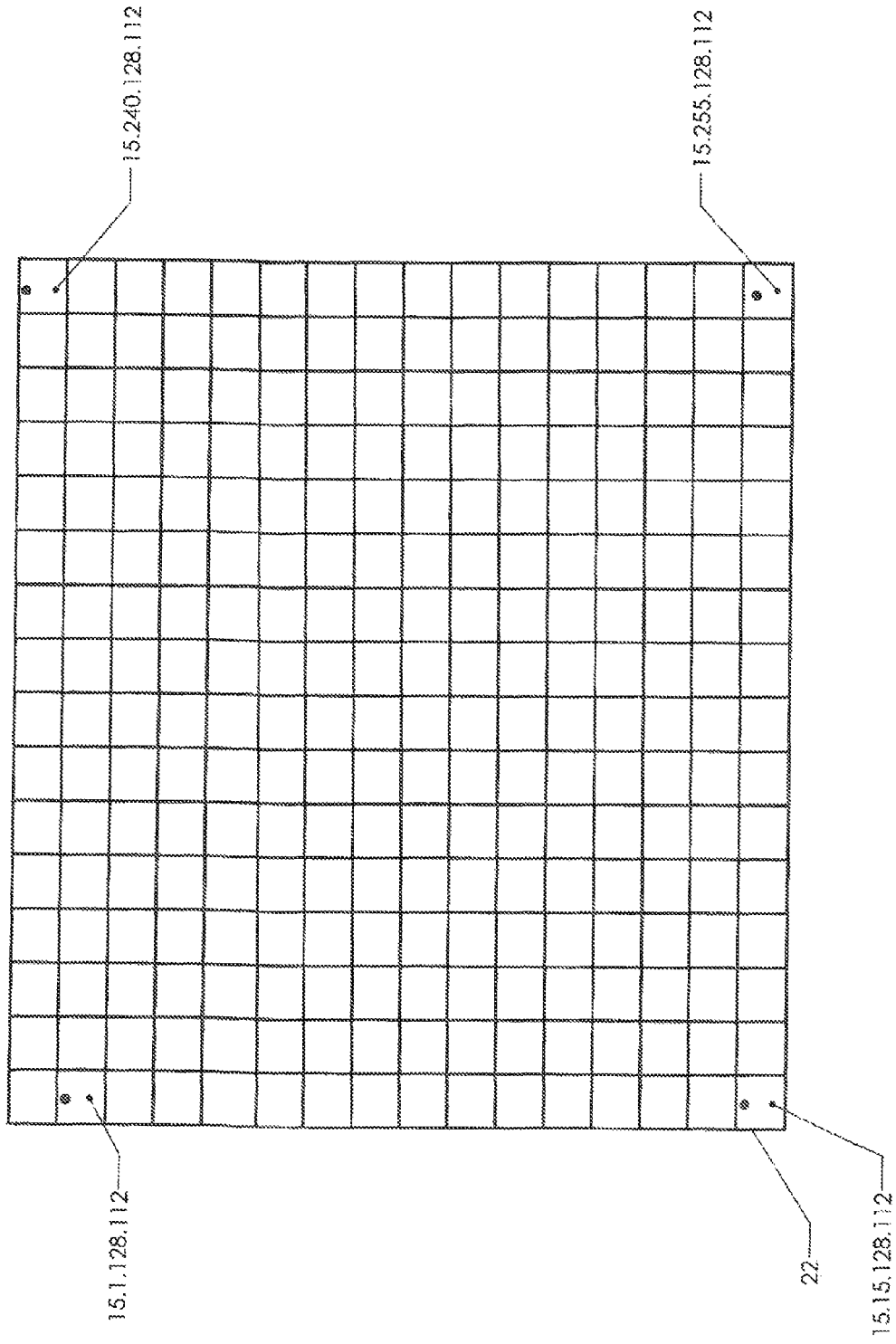
FIG. 4 is a detail view, showing the view of FIG. 3 in which four exemplary Internet addresses are plotted on the grid display.

The reader will readily perceive that the sub-cells may be further subdivided to represent the third and fourth octets of the IPv4 address. FIG. 4 shows representative addresses within first octet fifteen (labeled as "22" in the view). The address "15.1.128.112" is appropriately plotted within the second sub-cell. The address "15.15.128.112" is plotted within the sixteenth sub-cell. The address "15.240.128.112" is plotted within the $241^{st}$ sub-cell, while the address "15.255.128.112" is plotted within the $256^{th}$ sub-cell.

Returning to FIG. 1, the reader will thereby appreciate that every possible IPv4 address can be plotted precisely on IPv4 grid display 10. This function allows for the creation of a simulated three-dimensional display.

Figure 5:
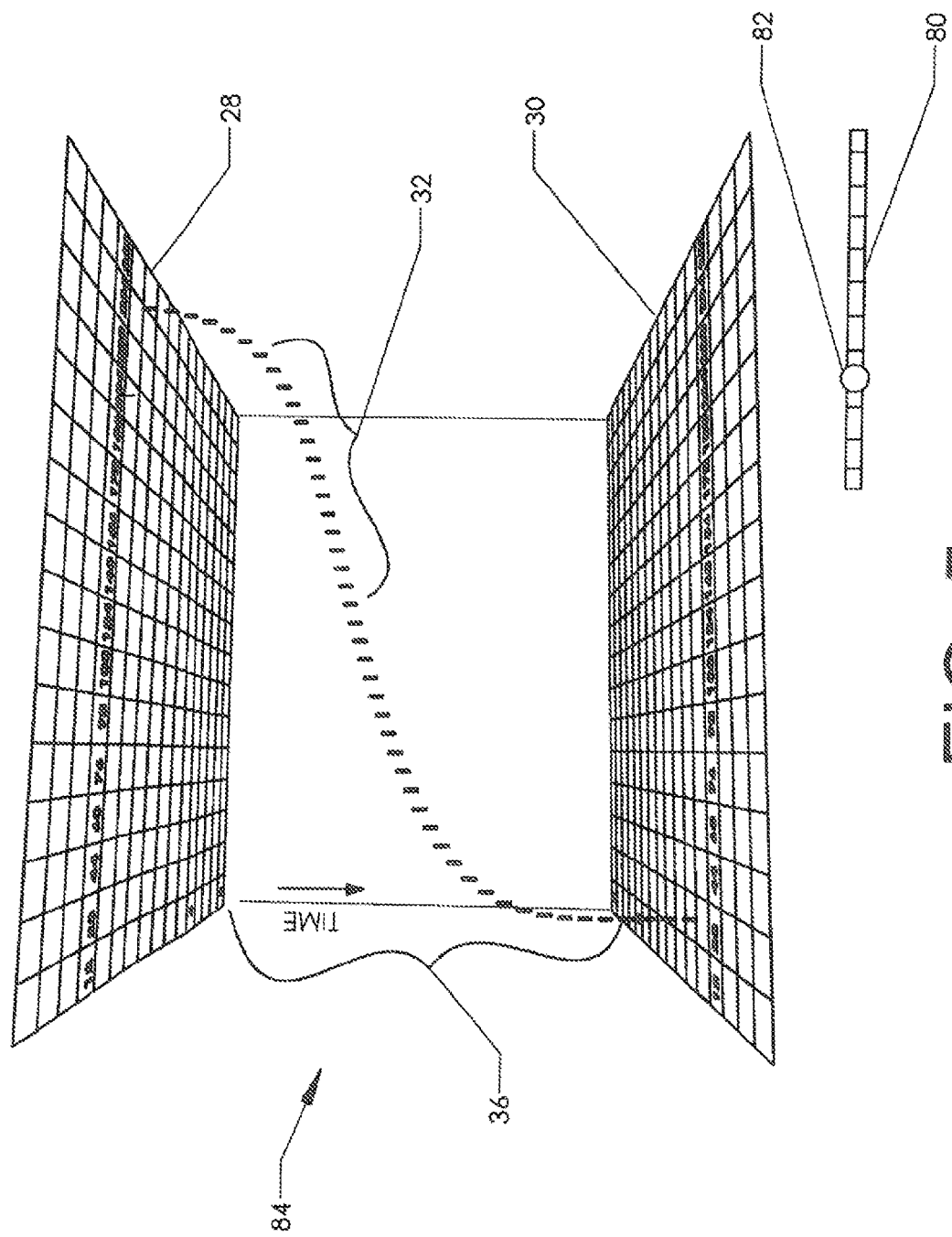
FIG. 5 is a view of the inventive computer-based display, showing the path for a single NetFlow event.

FIG. 5 shows one embodiment of a simulated three-dimensional display 84. The reader will note how this embodiment resembles the physical structure of a plate capacitor (hence its nickname of "Flow Capacitor"). The term "simulated" is used because the display will customarily be presented on a flat panel such as an LCD. Thus, the illusion of depth is created using simulated perspective. The depth illusion can also be created using stereo-viewing devices as are presently available on the market. It may also be possible at some future point to create an economical display that actually has three dimensions. The inventive method could be implemented using any of these technologies as well as others.

The basic concept of the inventive display is to depict network communication events as moving from a first surface to a second surface. The main parameters selected by a user in this example are the source IPv4 address for the communication event and the corresponding destination IPv4 address. In the embodiment shown, destination map 30 corresponds to IPv4 grid display 10 as shown in FIG. 1. In the embodiment shown, source map 28 is a mirror image of destination map 30. In other embodiments, the source and destination maps may be independently created, or may be transformations of other maps. Simple transformations may include copying, rotating, scaling, clipping, mirroring, clustering, etc.

Source map 28 is the first surface in this embodiment and destination map 30 is the second surface. The two surfaces are separated by a distance—labeled as separation 36 in the view. Simulated perspective is preferably added to the depiction so that a viewer may easily observe the two surfaces as they face each other.

Each individual communication event is depicted as an object or objects traveling from source map 28 to destination map 30. The point of origin of a communication event is plotted as its IPv4 source address on source map 28. It departs the source map and travels along dart path 32. Dart path 32 terminates at the IPv4 destination address for the particular communication event.

Figure 6:
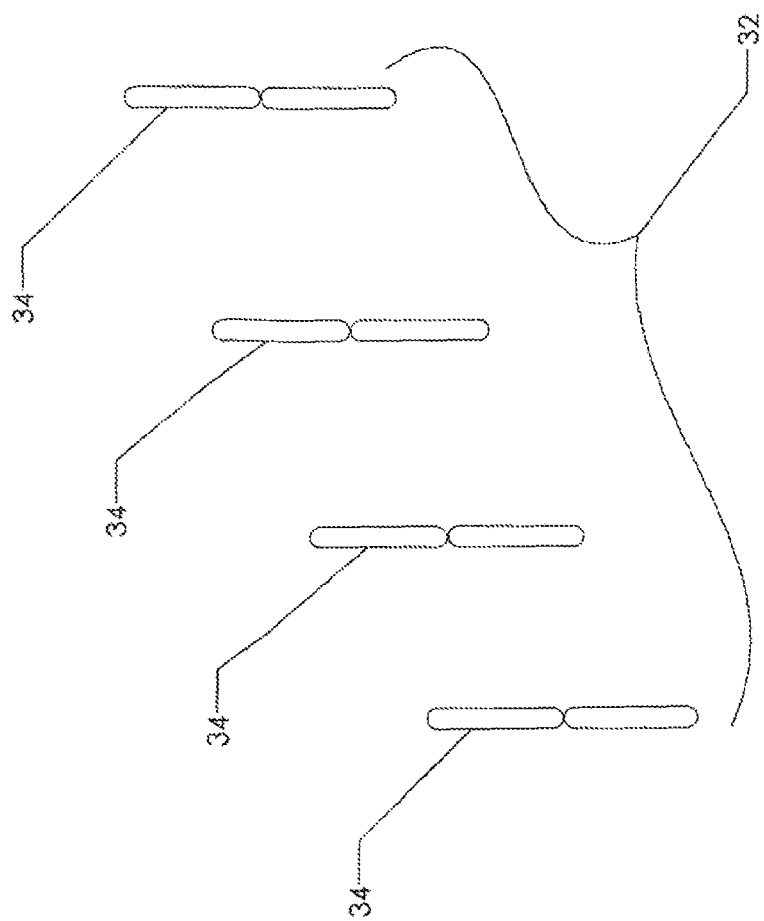
FIG. 6 is a detail view, showing a portion of the path of the NetFlow event depicted in FIG. 5.

FIG. 6 shows an enlargement of a portion of dart path 32 from FIG. 5. Each communication event is preferably depicted as an individual object such as event dart 34. Those skilled in the art will know that each communication event contains a number of bytes. It is common for a series of such messages to pass from one specific address to another in a stream. Thus, each dart path 32 is formed by a stream of communication events. The display projects a plurality of individual event darts 34 which move along dart path 32. When a number of communication events are sent in quick succession, portions of dart path 32 may appear to form a nearly solid line. However, in many instances it will be possible to perceive individual event darts.

The display software can cause the dart path to project in various ways. Returning to FIG. 5, those skilled in the art will realize that dart path 32 could simply be projected as a straight line between the source IPv4 address and the destination IPv4 address. However, in many cases, it is preferable to display the dart path as being normal to the two surfaces at the points where it intersects them. Accordingly, in the example shown, dart path 32 leaves source map 28 at a right angle and "impacts" destination map 30 at a right angle. A curve-generating function may be used to smoothly transition the dart path between these two constraints. Such a curved dart path is shown in FIG. 5.

Separation 36 is most often used to represent time. In this scheme an event dart would emerge from source map 28 at time $t_1$ and travel toward destination map 30. It would ultimately "impact" destination map 30 at time $t_2$, which is later than time $t_1$. The reader will observe in FIG. 5, that a stream of event darts is moving along dart path 32. As one proceeds along the flow path from source map 28 toward destination map 30, one is looking further and further back in time.

The amount of time depicted by separation 36 is preferably made adjustable. Communication events occur relatively rapidly across the Internet. Thus, the entire separation might only represent 1 second. Other circumstances might make a time separation of ten seconds preferable (though in other applications the time interval could just as easily be hours, days, or years). The user is preferably allowed to adjust the interval (along with many other visualization features, as will be described subsequently).

In other embodiments the separation might not represent time at all. Rather, the travel of an event dart from the source map to the destination map merely represents data transfer with no accounting for the elapsed time involved. In such an embodiment the velocity of the event darts along a path could be used to represent the duration of a particular communication event (with darts relating to long duration events moving rapidly and darts relating to short duration events moving slowly). Many other variants will occur to those skilled in the art. For example—when the visualization tool is used to depict physical vehicle traffic—the separation might represent the physical distance between a starting physical location and an ending physical location.

Figure 7:
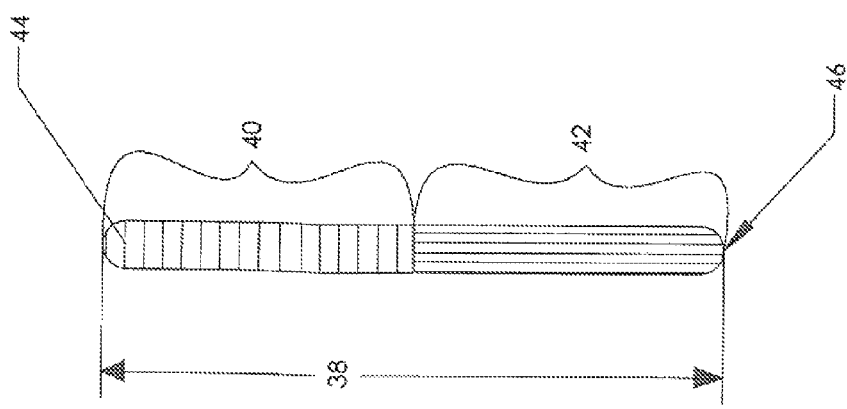
FIG. 7 is a detail view, showing a single "event dart" used to depict a NetFlow event.

FIG. 7 depicts one embodiment of the event darts shown in FIGS. 5 and 6. Event dart 34 preferably has several attributes that indicate characteristics of the communication event it represents. First, the length of the event dart is preferably made proportional to the number of bytes in the communication event. Thus, event dart size 38 preferably increases with a larger number of bytes and decreases with a smaller number of bytes.

Second, the event dart is preferably color coded to indicate its source region and destination region. This may be done by splitting the event dart into event dart head 42 and event dart tail 40. The event dart head lies closer to the destination map and the event dart tail lies closer to the source map.

Third, it is possible to provide each event dart with one or more highlighting elements. A highlighting element is anything that provided information as to one or more additional attributes linked to an event dart. Examples include making the event dart brighter, causing it to flash, causing it to vibrate, and attaching flags or other symbols to the event dart.

In order to explain the significance of the color coding scheme, the reader's attention is directed back to FIG. 1. In the Flow Capacitor example it is preferable to assign colors to the IPv4 grid displays—with the same color scheme being used for the source grid and the destination grid. Practically any desired color scheme could be used. However, it is preferable to provide a logically graduated color scheme. One approach is to use the visible color spectrum, which ranges from violet on one end to deep red on the other.

The address 0.0.0.0 can then be assigned to the violet extreme of the spectrum and the address 255.255.255.255 can be assigned to the red extreme of the spectrum. All addresses in between will then fall somewhere on the spectrum. Returning now to FIG. 7, destination color 46 is the color on the spectrum mapped to the destination IPv4 address. This color is preferably used for event dart head 42. Source color 44 is the color mapped to the source IPv4 address. This color is preferable used for event dart tail 40. Thus, if a user sees one event dart following along a flow path he or she can quickly learn the general source area and general destination area for the event dart.

The color-coding scheme could also be selectively applied to the IP source and destination ports in use (rather than the source and destination IP addresses). In this scheme the event dart head would be color matched to a color assigned to the destination port and the event dart tail would be color matched to the source port.

Many other color schemes could be applied. As another example, the different octets of the IPv4 addresses could be mapped to Red/Green/Blue values ("RGB values"). The first octet could be mapped to red, with the second octet being mapped to green, and the third octet being mapped to blue. Thus, a first octet address of "0" would have no red while a first octet address of "255" would have the maximum amount of red. A second octet address of "0" would have no green while a second octet address of "255" would have the maximum amount of green.

As the preceding suggests, the event darts can be configured to graphically display many different attributes of the communication event the dart depicts. Exemplary displays are shown in the following table:

TABLE ONE

| Attribute | Depiction in Message Event Dart |
|---|---|
| Number of bytes transferred | event dart length |
| Source IP address | event dart tail color; initial dart location |
| Destination IP address | event dart head color; final dart location |
| Source port | event dart tail color; dart path via port rings |
| Destination port | event dart head color; dart path via port rings |
| Source geo-location | initial event dart location |
| Destination geo-location | final event dart location |
| Flow communication duration | event dart speed |

Figure 8:
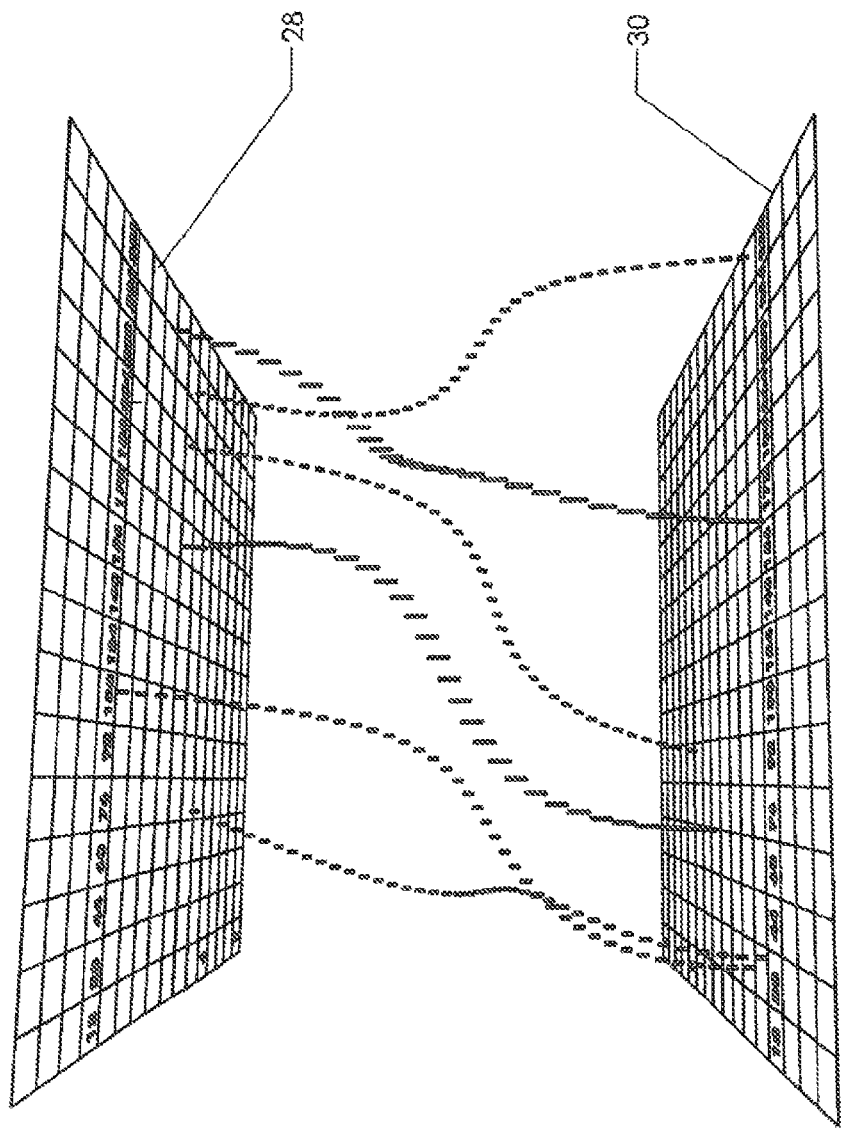
FIG. 8 is a view of the inventive computer-based display, showing multiple event dart paths, each with its own source and destination address.

FIG. 5 shows a plurality of event darts moving along a single dart path 32. The invention is particularly well suited to depicting many such dart paths at the same time. FIG. 8 shows the same source and destination map depiction with many dart paths 32 depicted. The reader will observe how the event darts and the spacing between the event darts on the different dart paths vary. These variations correspond to variation in the property values for the individual communication even that the event darts represent.

FIG. 8 is of course a static image, but in reality the visual presentation of the present invention is a dynamic one (unless the user "freezes" the display). The event darts will "cascade" from source map 28 toward destination map 30. In the orientation shown, the event darts seem to be falling like rain drops. It is important to note, however, that the user is preferably given the ability to pan, zoom, and reorient the view. Thus, the user could rotate the view about an axis that is normal to the viewing plane of FIG. 8. If the user rotates the view 180 degrees around this axis, then the destination map will be on top and the source map will be on bottom.

An important concept of the inventive display is the flowing movement of the event darts between two or more surfaces. In some instances it will be desirable to provide additional display features between the surfaces. As an example, in some instances it will be advantageous to group the dart paths 32 according to the destination port. As an example, since Web servers typically "listen" for requests on TCP Port 80, traffic on that particular port might be of interest (such as when a user is attempting to identify "denial-of-service" attacks).

Figure 9:
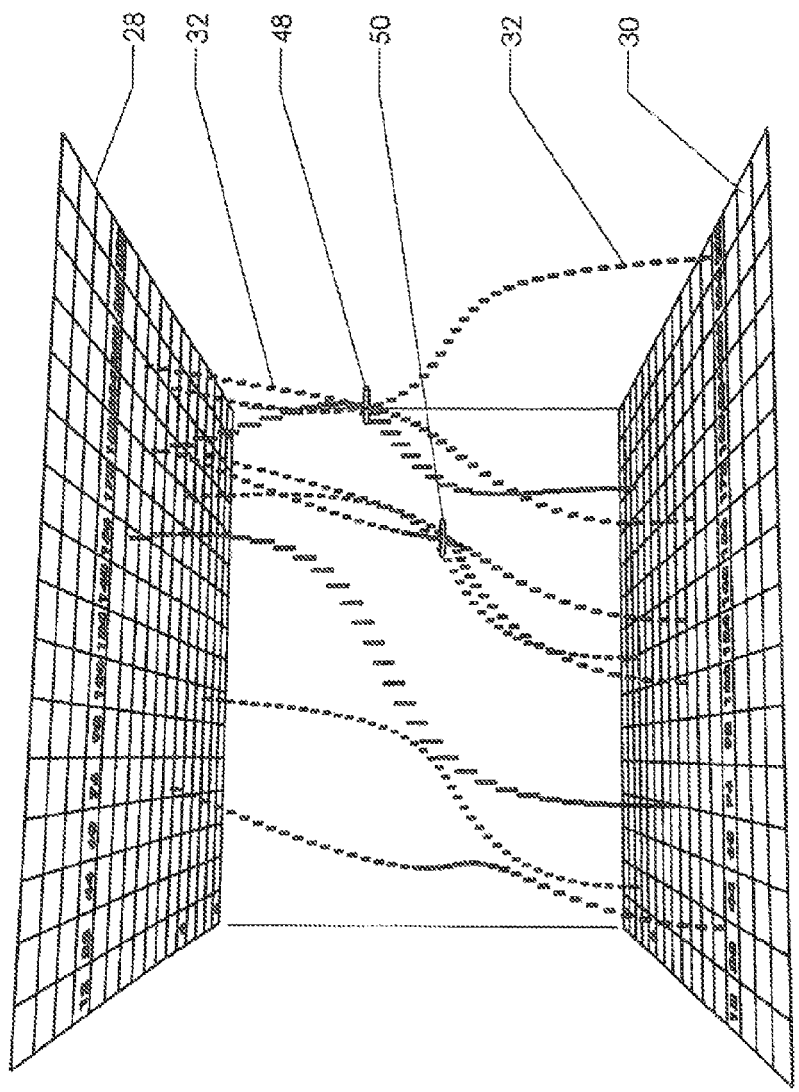
FIG. 9 is a view of the inventive computer-based display, showing the paths of NetFlow events being grouped according to a property of the event (in this case the destination port of the NetFlow data).

FIG. 9 shows an additional visualization tool which can help a user to monitor traffic pertaining to a particular destination port. Port rings 48 and 50 are positioned by the user (preferably using a graphical pointing device such as a mouse). These rings may then be assigned to a specific source or destination port. As an example, port ring 50 can be assigned to destination port http: 80. The display software then causes all the dart paths using destination port 80 to pass through port ring 50. If this produces unwanted visual cluster the user may employ a pointing device to "grab" port ring 50 and move it to an emptier part of the display.

Each dart path passing through port ring 50 still originates at the same point on the source grid and terminates at the same point on the destination grid. The display software causes the dart path to bend so that it passes through the assigned port ring. This feature allows the user to visually group dart Paths having common characteristics.

The port rings may be generalized as "attribute rings" and used to sort the event flows on the basis of some other defined criterion. As an example, an attribute ring could be used to collect data flows on a network with the criterion being the selection of data flows exceeding a certain size. These large data flows would then be visually depicted as passing through the defined attribute rings.

Figure 10:
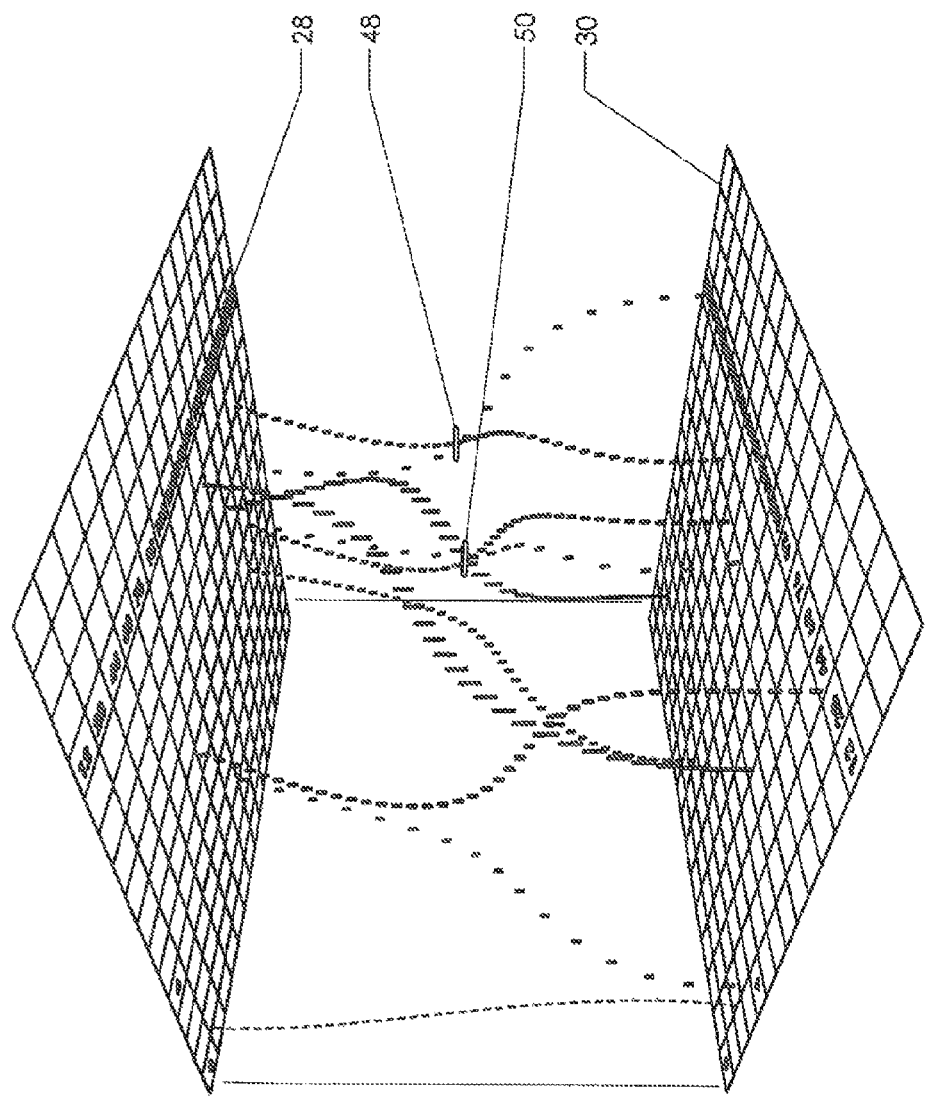
FIG. 10 is a view of the display of FIG. 9, with the orientation being rotated to a different vantage point.

Providing the user with the ability to pan, zoom, and reorient the display allows the user to more easily visualize groups of data that may be of interest. FIG. 10 shows the same display as FIG. 9 with the vantage point being rotated about 75 degrees about a vertical axis. The reader will observe how rotating the vantage point provides a different view of the dart paths and other features. The user may also choose to define a zoom window that will then be enlarged—or possibly broken out into an entirely separate window.

A primary advantage of the present invention is its ability to present large trends in a manner that can be intuitively perceived through observation. A user who regularly views the depiction will gain an intuitive understanding of what normal and anomalous Internet traffic looks like. Such a user may regularly zoom in on one set of destination addresses and another set of source addresses in order to gain familiarity with a particular class of traffic.

One topic of interest is the identification of "denial-of-service" attacks. Such attacks assume many forms, but one common form involves an "attacker machine" distributing requests through many handler machines that then repeatedly transmit service requests to the target site. The target site is thereby overwhelmed and is unable to respond in a timely fashion to normal requests. A large attack may even overwhelm entire geographical regions of Internet connectivity by overstressing the data carrying capacity in that region.

Some such attacks are initiated by hackers for personal reasons or—in some instances—no discernible reason other than to demonstrate the capability. However, cyber-attacks are now thought to be a likely component of geopolitical conflicts. Thus, such attacks may be well-funded and extremely sophisticated.

The source of a cyber-attack may be quite difficult to identify. One reason for this is that the data transmission protocols do not generally verify the IPv4 source address. They assume it to be authentic. Many methods exist, however, to falsify the source address. This is a common feature of cyber-attacks, in which the source appears to be a multitude of different computers that are in reality compromised pawns of the network that is actually orchestrating the attack.

All of these factors make identifying a cyber-attack via a standardized methodology quite difficult. On the other hand, the intuitive visual presentation afforded by the present invention allows an experienced user to rapidly perceive an anomaly.

The view of FIG. 10 provides an example. Assume for this example that port ring 50 is assigned to TCP Port 80. A system administrator could be using this view to monitor requests coming in to a Web server he or she is responsible for. The administrator would be accustomed to seeing a particular progression of communication event types and volumes—often dependent upon the time of day. If the Website Primarily serves customers in the United States, it would be typical to see a "ramp up" of data during the morning business hours in the eastern U.S. This would appear as an increasing mass of message event darts originating from a variety of IPv4 source addresses and passing through port ring 50 before terminating at a single IPv4 destination address.

A denial-of-service attack would look quite different. A typical progression for a denial-of-service attack on a hypothetical power infrastructure is as follows:

1. Blacklisted scanners (known bad actors) get control signals from an unknown command-and-control node (which is not on the existing blacklist because it is not yet known);

2. Blacklisted scanners hit whitelisted (known good actors) power infrastructure nodes geographically located in the western U.S.;

3. Some of the whitelisted power infrastructure nodes respond to the scanners. The scanners send the responses onto a C2 node;

4. Blacklisted "bots" (compromised computers which will execute commands without the consent of their operators) receive control signals from the C2 node;

5. Blacklisted "bots" attack whitelisted power infrastructure nodes; and

6. Unknown nodes (not yet on the blacklist) also attack the whitelisted power infrastructure nodes.

The administrator would see a near-simultaneous onset of multiple event darts from multiple source addresses cascading into the whitelisted nodes. This would be the first and immediate indication that a denial-of-service attack was in progress. These dart paths would remain continuously "on." Thus, there would be a visual depiction of continuous streams rather than a constant shifting among many more source addresses. The visual depiction would therefore allow a much more rapid determination that a denial-of-service attack was in progress.

The events that triggered the attack (steps 1 through 4) would be difficult to detect. However, once the user sees the denial-of-service attack in progress, the Flow Capacitor can be set to look back in time (even to run the event darts backwards). The user can then zoom in on the message flows back to the bots, back to a C2 node, and back to the messages that originally triggered the attack. All this may be done quite rapidly using the visual tool.

Figure 11:
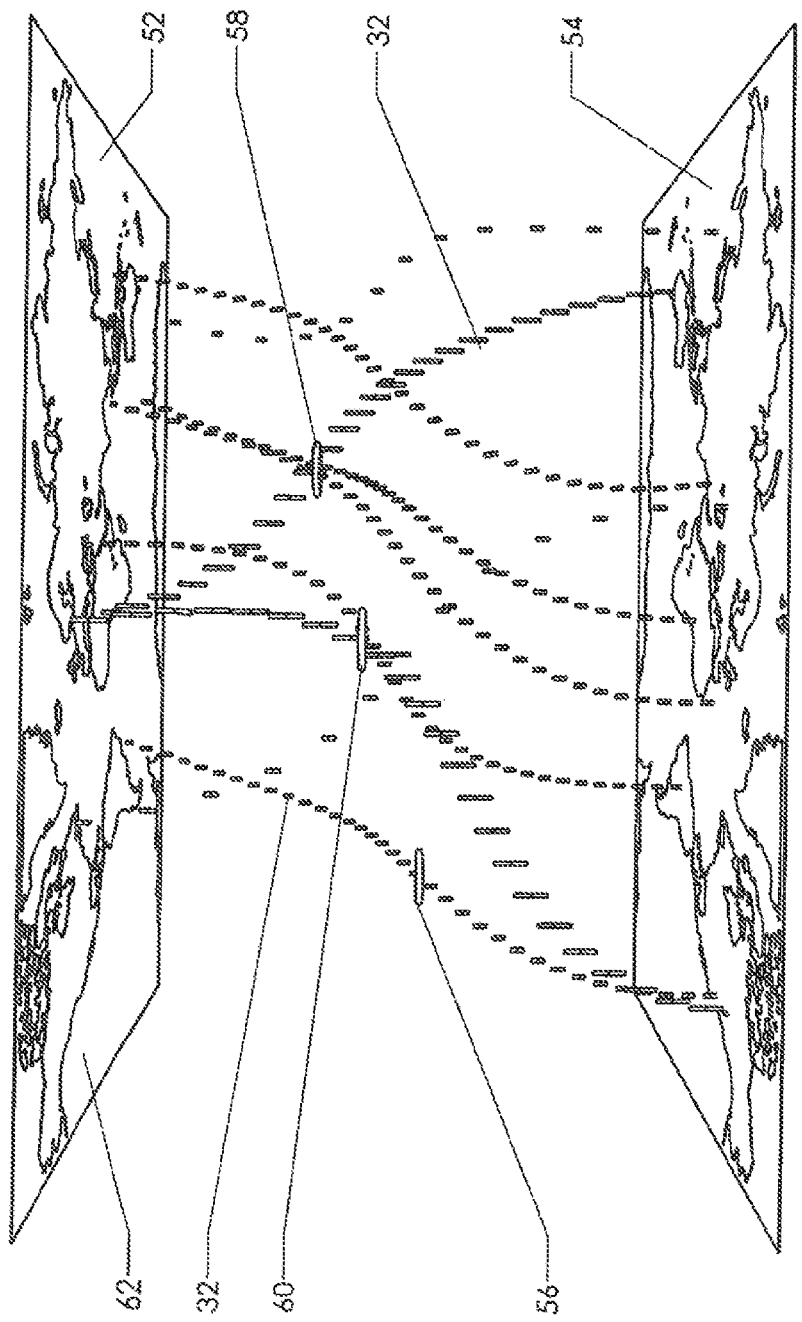
FIG. 11 shows an alternative embodiment of the inventive computer-based display, in which the Internet source and destination addresses have been referenced to a geographical map.

Other mapping methodologies can be used for the source and destination map surfaces which make the learning of normal communication patterns more convenient (and in fact a user may wish to select among between different mappings for the source and destination maps). FIG. 11 shows one such embodiment. It is possible to reference IPv4 addresses to the geographic location of the sender and receiver (at least to the level of the network). This information can be used to create geo-referenced source map 52. In the embodiment shown, the visual display includes Mercator projection 62 of the world on geo-referenced source map 52. A mirror-image Mercator projection is also presented on geo-referenced destination map 54.

Port rings (designated as 56, 58, and 50) can be selectively placed by the user as described previously. Dart paths 32 originate and terminate according to their IPv4 addresses. However, the IPv4 addresses are now referenced to the two Mercator projections so that the dart paths flow from one location on the Mercator map (on geo-referenced source map 52) to another location on the Mercator map (on geo-referenced destination map 54).

This functionality aids the visualization of normal communication paths and will often facilitate the identification of anomalies. As an example, a user will expect to see dart paths originating in the eastern U.S. at the commencement of normal working hours in that part of the world. If instead the user sees a flurry of dart paths originating in California (assuming that it is 5 A.M. in California) that would be viewed as unusual and worthy of further investigation.

Color-coding can be applied to the geo-referenced maps as well. If, for example, hostilities exist between two nations, it might be desirable to color-code the IP addresses in those nations in bright yellow so that traffic originating in those nations could be more easily seen.

The geo-referenced maps themselves can assume many forms. If for example a user is monitoring a Web server associated with a business that only takes order in the U.S. and Canada, the geo-referenced map might be limited to the U.S. and Canada. A single point source and point destination could be shown for "everywhere else." The ability for the user to selectively expand the single point source into a geo-referenced map for the rest of the world could also be provided.

The reader should note that the surfaces depicted for the source map and the destination map need not be planar. Curved projections, or even surface relief maps could be used. The function of the inventive display would still operate in the same manner. Conceptually-defined planes categorizing flows from certain types of groups (criminals, terrorist organizations) or economic sectors (financial, transportation, energy) may also be used, along with appropriate color-codings for the event darts and the display surfaces.

The use of the port rings has previously been discussed as a method of providing additional information regarding the data depicted in the flow paths. Other methodologies for presenting additional information may be added as well. The Flow Capacitor is properly seen as a basic configuration of a PC3O (Parallel Coordinates 3D Observatory). A more complex embodiment extends the number of surfaces to depict additional attributes of the subject being viewed. The surfaces may be parallel planes stacked several layers deep. They need not always be parallel, however. In fact, in some cases it will be easier to see paths between surfaces that are not parallel.

Figure 12:
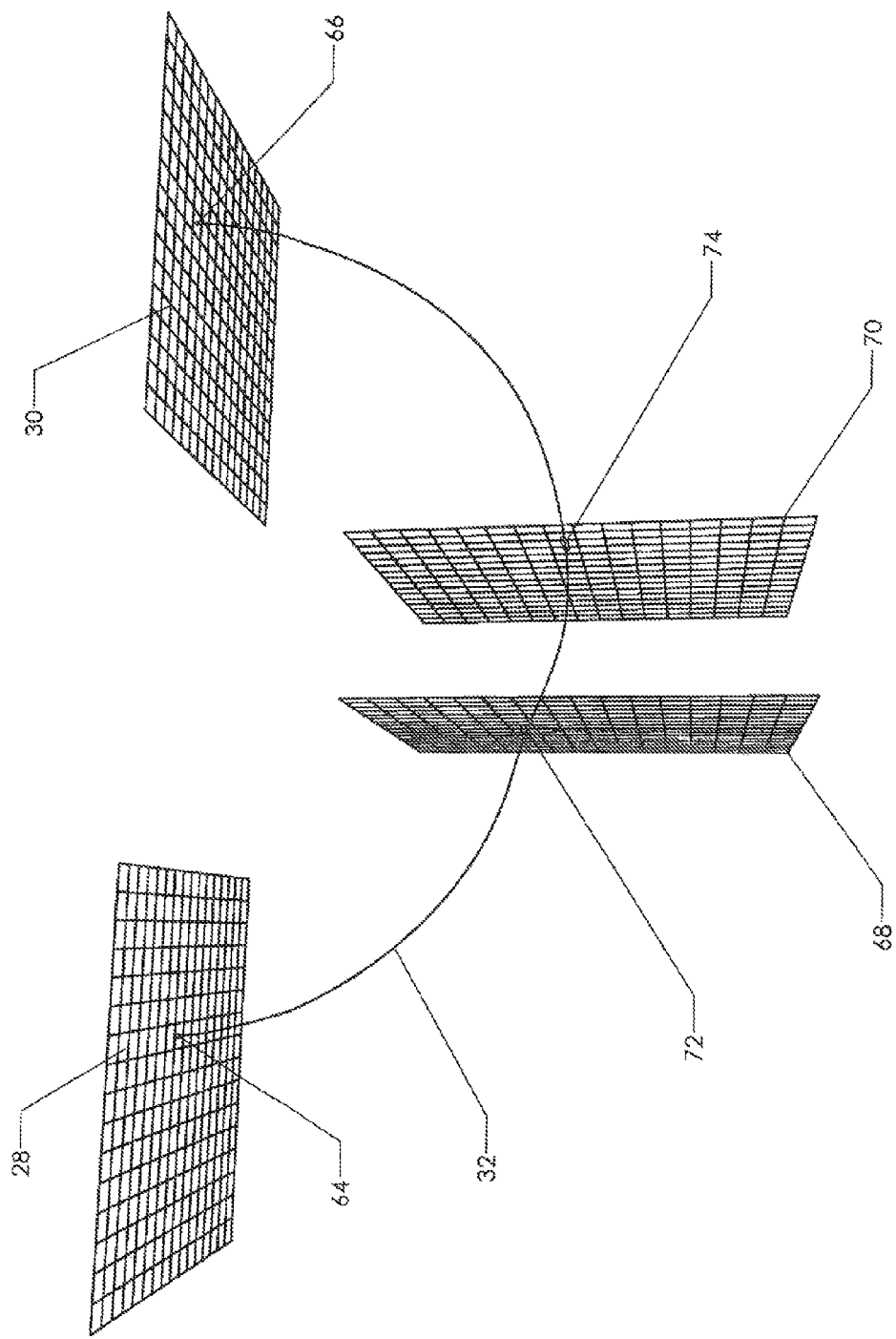
FIG. 12 shows another alternative embodiment of the inventive computer-based display, in which additional grid surfaces for one or more selected data features have been added in the dart paths.

FIG. 12 shows one such embodiment in which two additional feature presentation surfaces have been added between the source map and the destination map. In the embodiment of FIG. 12, first feature plane 68 and second feature plane 70 have been added between source map 28 and destination map 30.

Rather than being placed in offset parallel planes, source map 28 and destination map 30 are placed in the same plane—with the first and second feature planes being placed in an orientation that is perpendicular to both the source and destination maps. The orientation of the planes is not critical. The orientation shown in the view is simply to facilitate viewing. Dart path 32 originates at point of origin 64 on source map 28. It passes through the first and second feature planes before terminating at point of termination 66 on destination map 30.

The point at which the dart path "impacts" each feature plane provides useful information. Dart path 32 impacts first feature plane 68 at first feature plot 72 and second feature plane 70 at second feature plot 74. A curve fitting algorithm is preferably used to provide a smooth curve that is perpendicular to all four of the planes shown.

Figure 13:
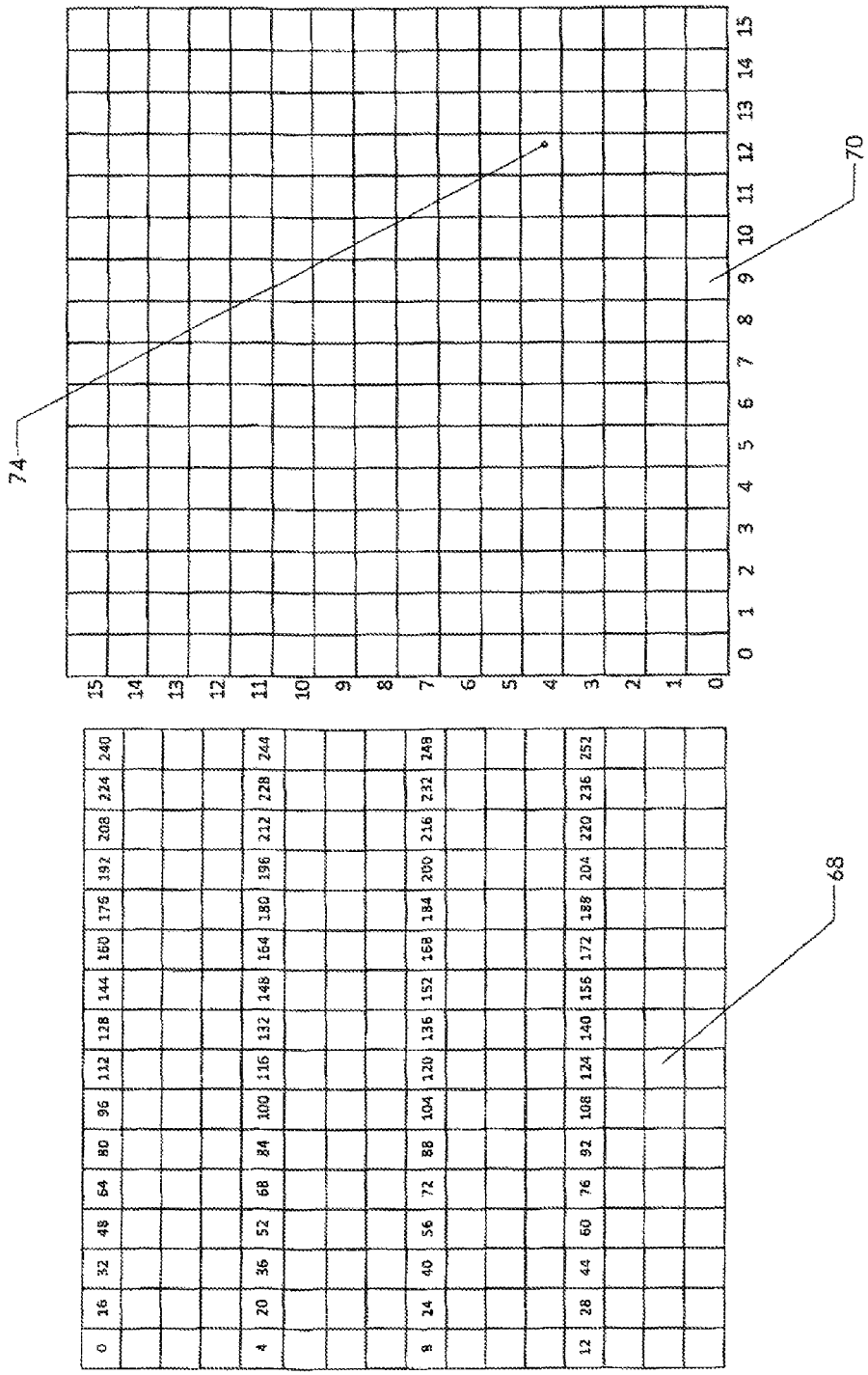
FIG. 13 is a plan view, showing grid plots for the ranges of values applicable to two selected event features.

FIG. 13 provides a plan view of first feature plane 68 and second feature plane 70. Many different pieces of information could be mapped to the feature planes, including any of the NetFlow attributes listed in TABLE ONE. In the embodiment shown, first feature plane 68 is a plot of the port ring ID. Thus, a data stream directed to TCP Port 80 would pass through the cell corresponding to that port. A data stream directed to TCP Port 20 would pass through the cell corresponding to that port, and so forth.

Second feature plot 74 is an "X-Y" plot with the data packet size being placed on the Y-Axis and the data transmission rate being placed on the X-Axis. Thus, second feature plot 74 will vary as these two characteristics of each communication event vary.

Figure 14:
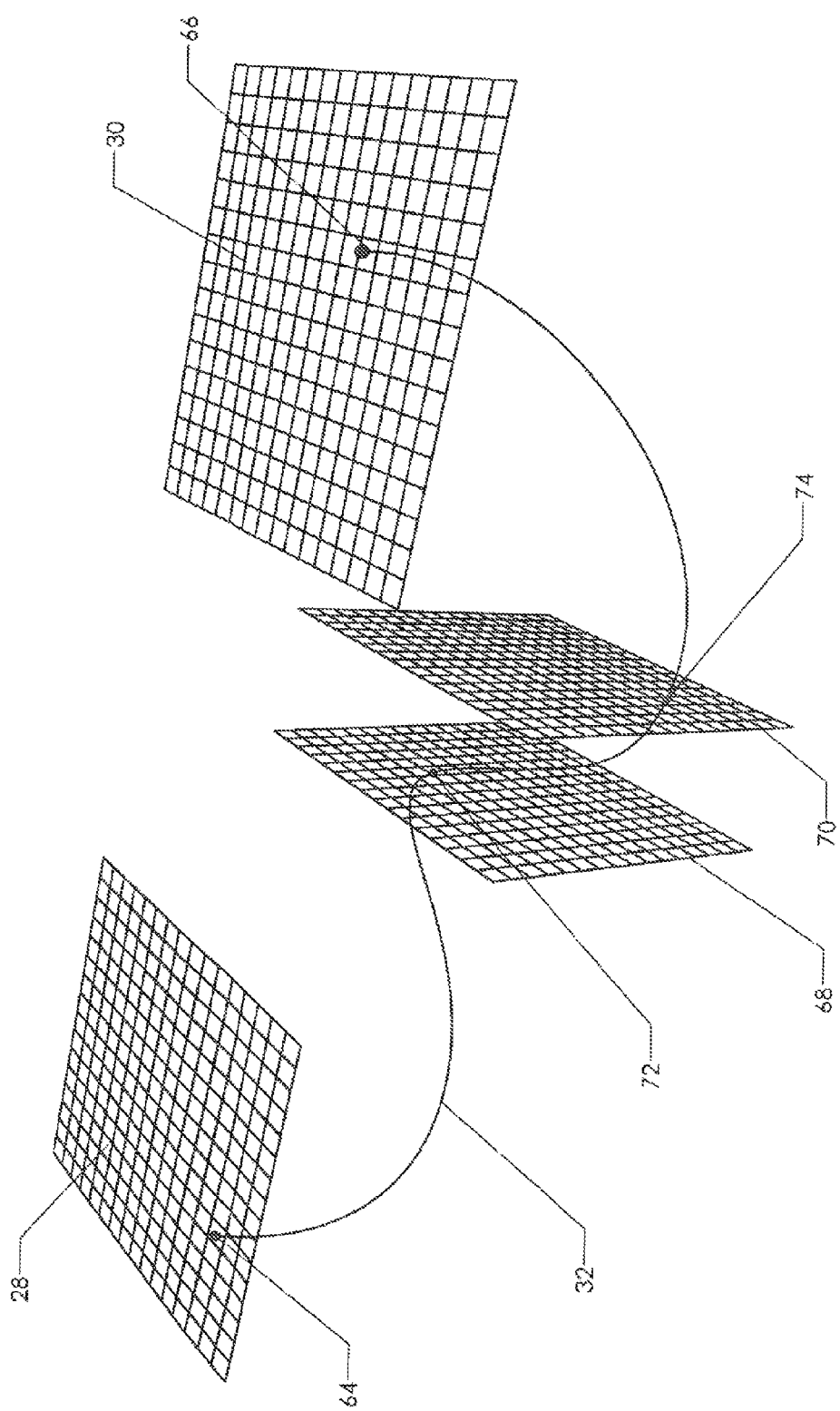
FIG. 14 shows the embodiment of FIG. 12 with the orientation being rotated to a different vantage point.

The user is preferably given the ability to pan, zoom, and reorient the graphical presentation as for the prior examples. FIG. 14 shows how a dart path might look when the user has reoriented the view so that the vantage point is looking down on source map 28 and destination map 30. In this embodiment all the surfaces are preferably made transparent or semi-transparent so that they may be viewed from either side. Dart path 32 is depicted as a solid line flowing along from point of origin 64 to first feature plot 72 to second feature plot 74 and thence to point of termination 66. The dart path may also be represented by a chain of event darts as was shown in FIG. 8. In any embodiment, the dart path may be depicted in numerous ways (with a solid line and a chain of flow darts being properly viewed as two examples among many more possibilities).

Figure 15:
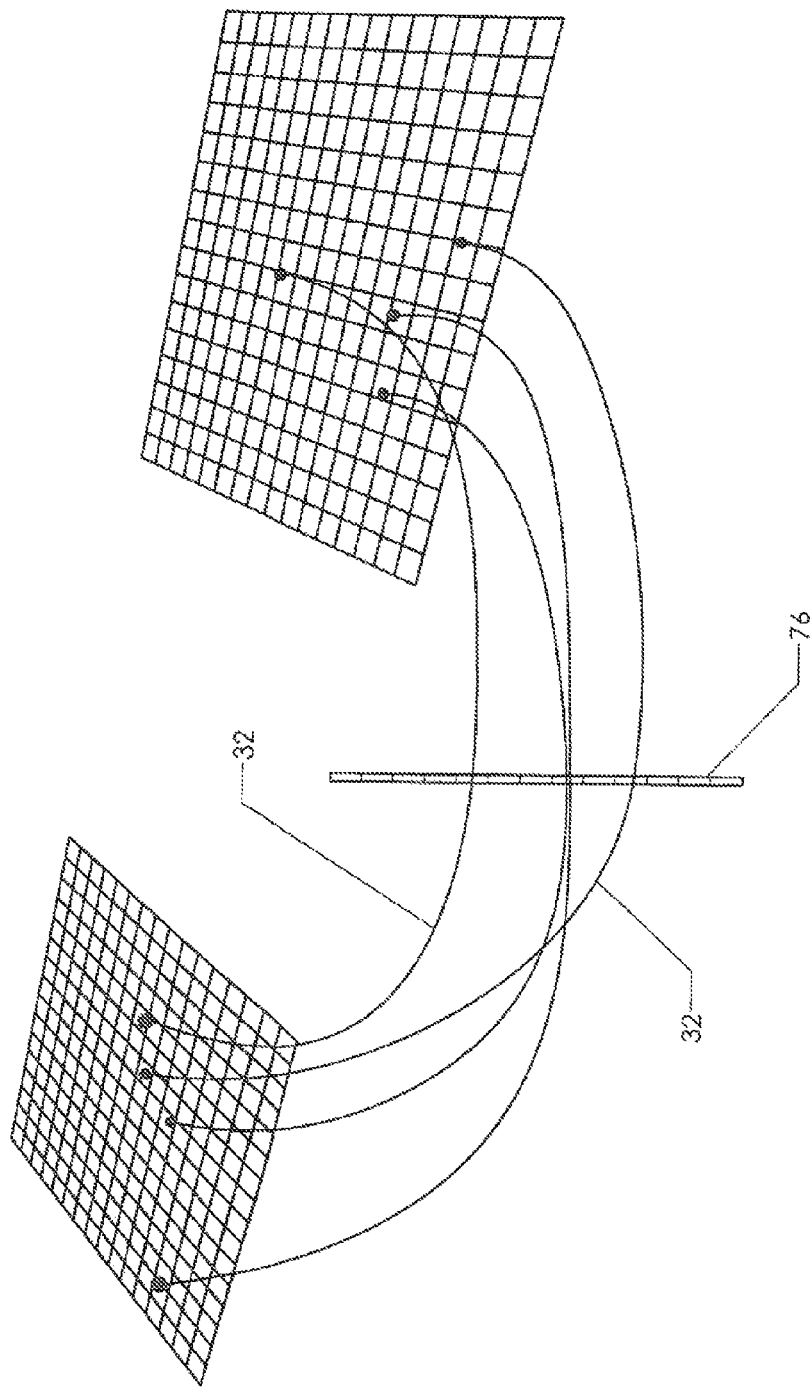
FIG. 15 shows still another embodiment of the present invention, including a linear feature plot.

The reader should also bear in mind that the feature plots can assume many different forms and are certainly not confined to planar representations. FIG. 15 shows still another embodiment in which the feature plot is presented as linear feature plot 76. This is a single-axis plot. A user might choose to plot data packet size on linear feature plot 76, with larger data packets intercepting this feature at a point above smaller data packets. Dart paths again pass from the source map to the destination map (through linear feature plot 76). Dart paths including large data packet size would tend to translate upward since they would "plot" higher on linear feature plot 76. This presentation would make it easy for the user to discern which dart paths have large data packets.

The reader will thereby appreciate that the inventive method provides an intuitive visual depiction of communication event information. Although the examples provided have pertained to the Internet as a whole, those skilled in the art will readily appreciate that the invention could also provide helpful visualization of data flow within a single network of multiple computers.

Those skilled in the art will also realize that many other helpful features could be added to the depiction. Returning now to FIG. 5, the reader will observe the presence of time bar 80 in the lower right portion of the view. The user is allowed to use a pointing device to select and drag current time indicator 82. This allows the user to "drag" the display back in time. As a default, current time indicator 82 rests at the right extreme of time bar 80. If the user sees a phenomenon which he or she wishes to watch again, the user can select the current time indicator and drag it to the left across time bar 80. When the user releases the current time indicator the display "rolls forward" at its normal pace. One could also implement slow/fast motion and fast forward/rewind features. It will often be desirable to store the display data for a period of time so that it can be subsequently analyzed. This feature is particularly helpful in analyzing cyber-attacks and "malware" activities.

Figure 16:
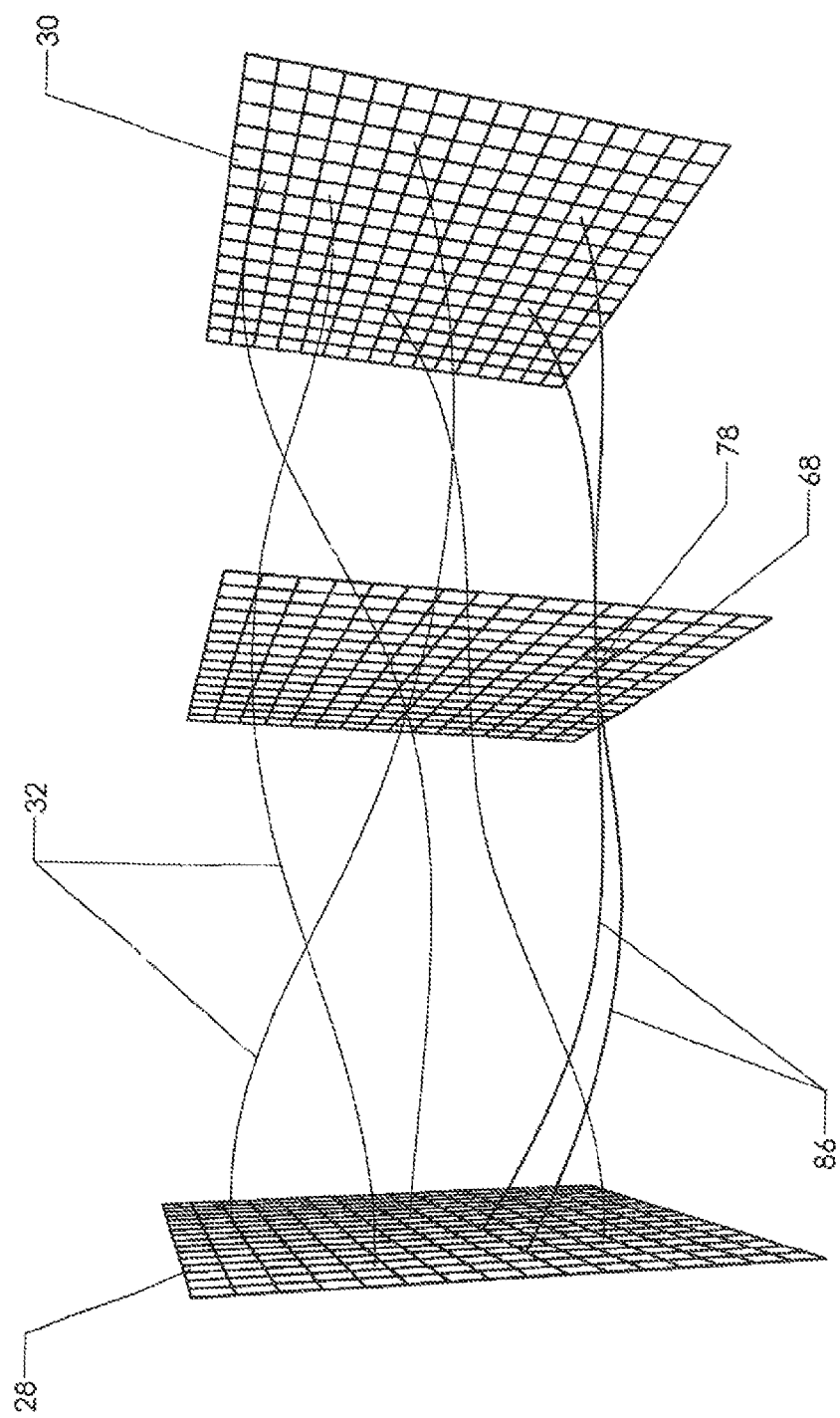
FIG. 16 shows still another embodiment of the present invention.

FIG. 16 illustrates still another embodiment among the many possibilities of methods for implementing the present invention. Source map 28 and destination map 30 are presented as parallel surfaces having a vertical orientation. First feature plane 68 is depicted as lying between the source and destination maps (and also being parallel). The cells lying within first feature plane 68 are each mapped to a particular destination port. Thus, each dart path 32 flows from a source address to a destination address, but passes through the port cell on first feature plane 68 that corresponds to the destination port ring in use. As an example, the reader will note that two dart paths 86 pass through a particular cell 78 (which has been mapped to the destination port being used by the two dart paths). The reader should also note that the dart paths in this embodiment are denoted as simple curved lines rather than a "train" of moving data darts.

Figure 17:
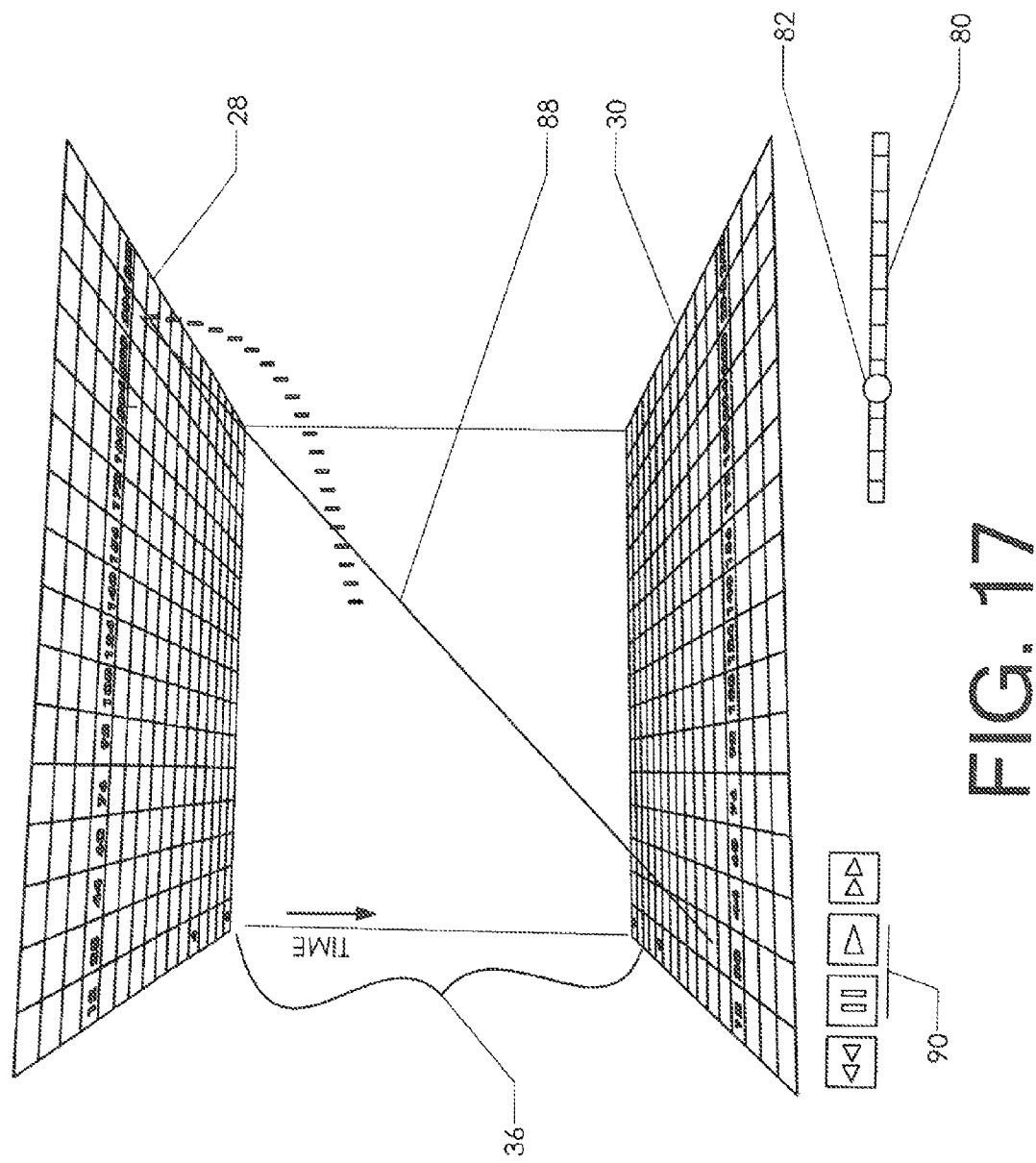
FIG. 17 shows an embodiment where the dart path is shown by a simple line connecting the source and destination in addition to an "event dart" moving from the source to the destination.

Numerous other enhancements and options are possible with the present invention. FIG. 17 shows an alternate embodiment of the embodiment presented in FIG. 10. In this version dart paths are shown as simple lines connecting the source and destination addresses (linear dart path 88). This version will in some instances allow a more rapid recognition of a communication event the analyst is looking for. The flow darts may optionally also be shown. FIG. 17 also shows the use of the previously explained time bar 80 and current time indicator 82. Additional display controls 90 may also be provided. These controls allow the user to pause the display, rewind the display, fast forward the display, and so forth.

Figure 18:
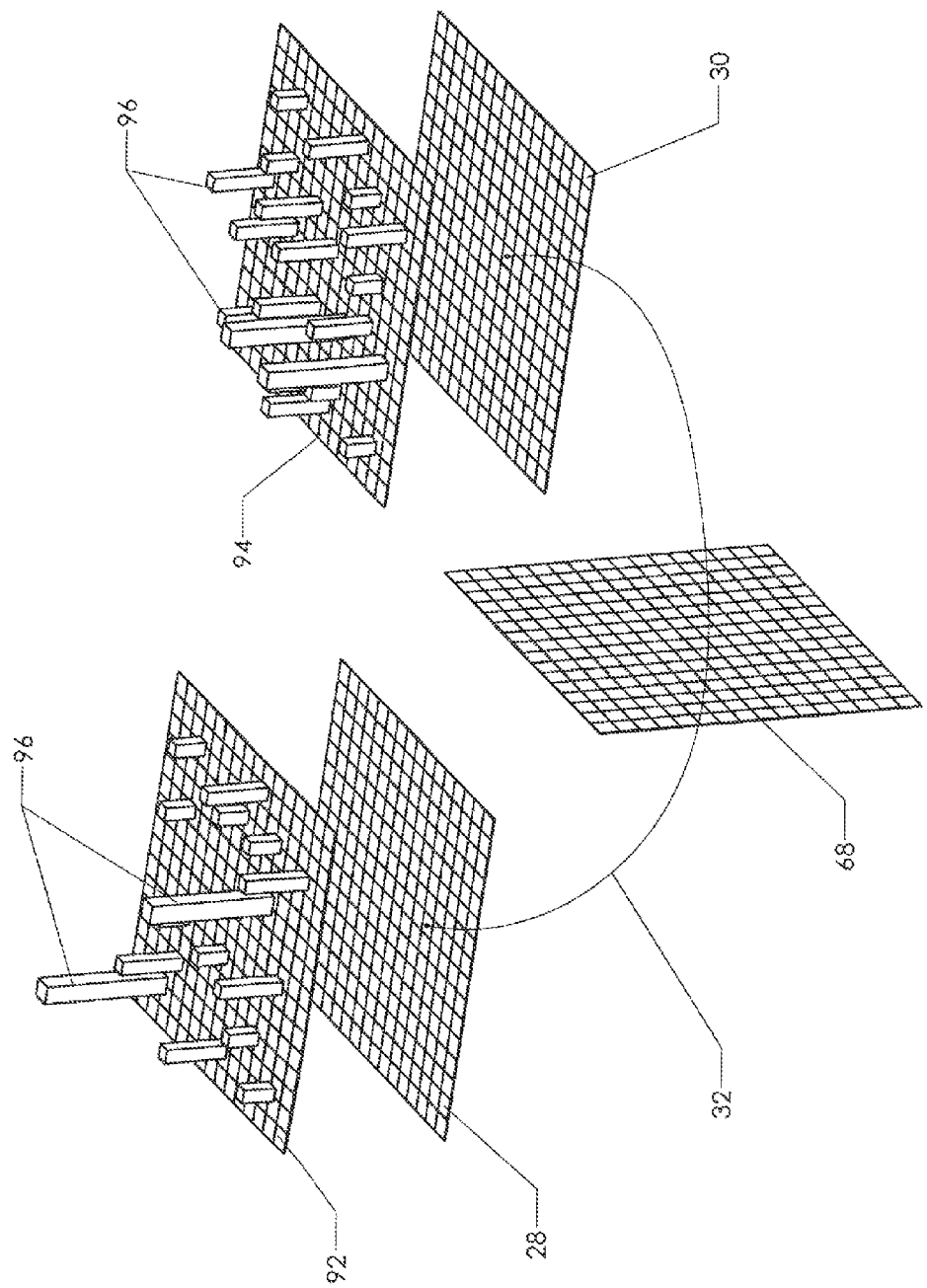
FIG. 18 is an embodiment including a depiction of accumulated communication events over time.

Of course, it may be desirable to present more than just a "slice" in time. An analyst may wish to know the total number of messages originating from or going to a particular address over a larger interval of time. This goal requires the presentation of accumulated event data. FIG. 18 presents one embodiment incorporating this feature. Source accumulation map 92 is projected above source map 28 and destination accumulation map 94 is projected above destination map 30. These additional maps depict the accumulation of data. As an individual IPv4 address receives more "hits" the height of the data plot 96 corresponding to that address is extended.

The accumulation maps may be plotted directly on the source and destination maps themselves. However, the visual clutter of the data plots may make it difficult to see the dart paths in that case. Thus, it is preferable to provide a separate accumulation map which is visually separated. One such visual separation can be obtained by giving the map surfaces a small degree of "thickness" that forms a wall-like border around the map surface. The accumulations, graphs, or other annotations could then be made on the wall-like border.

Figure 19:
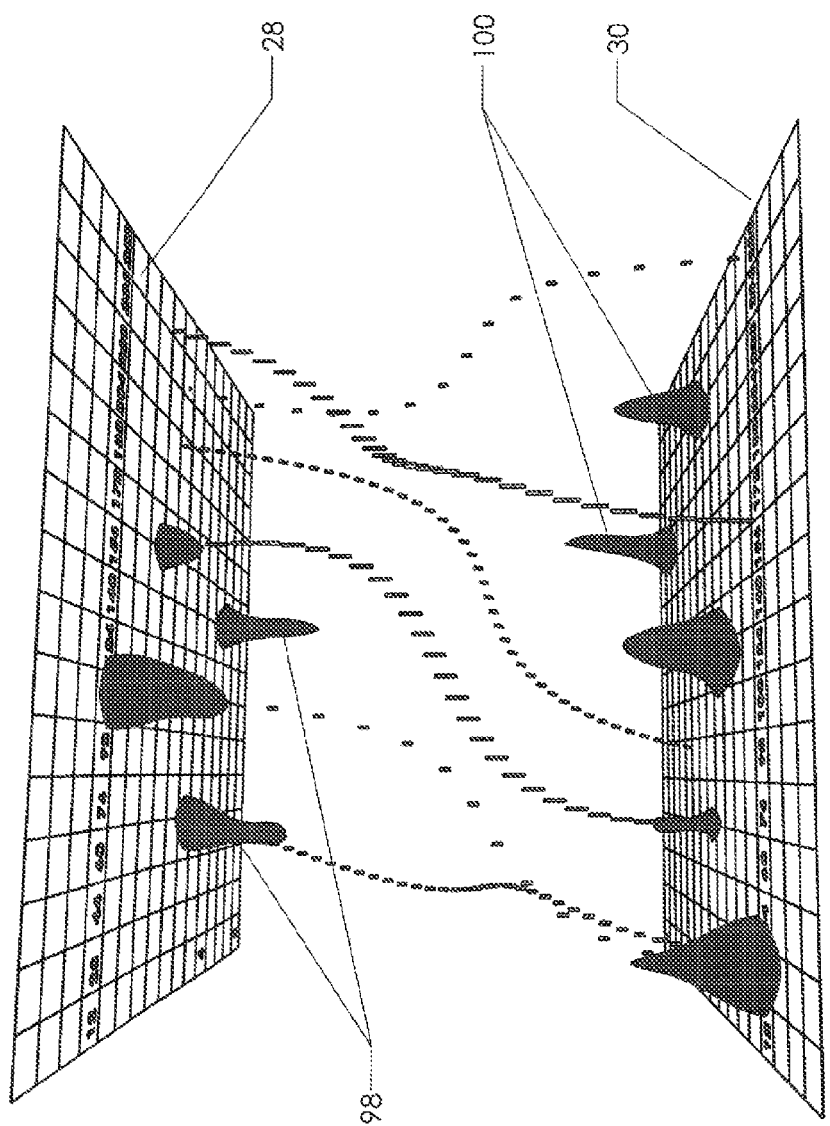
FIG. 19 is an embodiment showing an alternate depiction of accumulated communication events over time.

There are many different ways to depict the accumulation of communication events. FIG. 19 shows still another embodiment. FIG. 19 shows a relatively simple source and destination address map such as shown in FIG. 8. However, in the embodiment of FIG. 19, the accumulation of communication events over time is depicted visually using data stalactites 98 and data stalagmites 100. The nomenclature is used because of the resemblance of the depictions to the physical structures found in caves.

As more and more communication events originate from a particular source address on source map 28, the data stalactite 98 associated with that address extends further and further down from the source map. Similarly, as more and more communication events terminate at a particular destination address, the data stalagmite 100 associated with that address extends further and further up from destination map 30. The user is allowed to selectively "reset" the depictions so that they return to zero and begin a new "accumulation."

FIG. 20 shows still another embodiment for depicting data accumulation. Source accumulation map 92 and destination accumulation map 94 are again provided. These may be simple 2D plots, or they may be presented as an addition to a broader perspective view (as in FIG. 18). Data plots 96 assume a different form from the embodiment of FIG. 18. The data plots are presented as color-coded or otherwise patterned regions in a manner analogous to a thermal map. For example, a small amount of accumulated data could be presented as a blue-colored region while a very large amount of accumulated data could be presented as a red-colored region.

Figure 21:
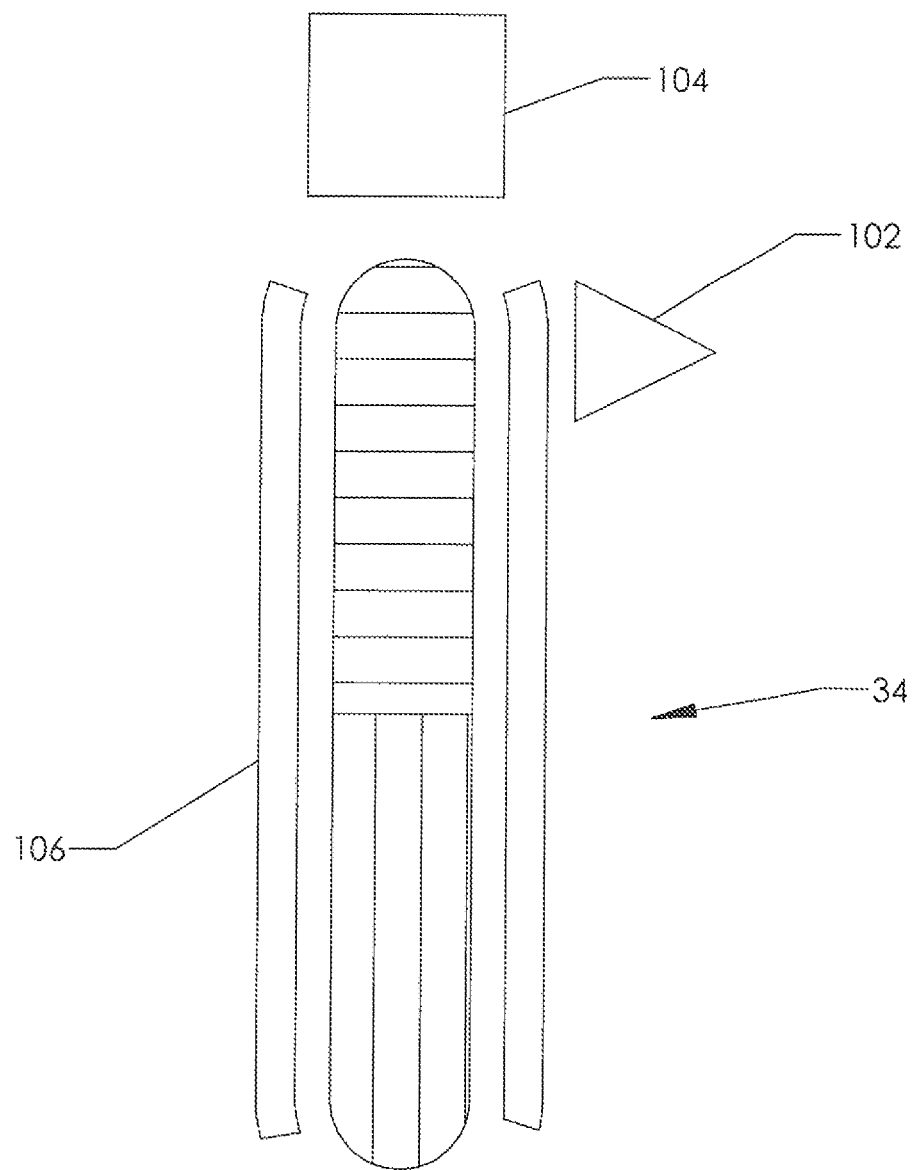
FIG. 21 shows several alternate enhancements that can be added to the event dart depiction to indicate the property values of the communication event.

It may also be desirable to enhance the visual presentation of the event darts themselves. FIG. 21 depicts a detailed view of an individual event dart 34. In some embodiments it is advantageous to enhance the event dart so that an analyst can more easily see it. As an example, an analyst may have a known "blacklist" of suspected IP addresses that have historically been used for denial-of-service attacks. If an event dart originates at one of these blacklist addresses, it could be appended with a flag 102 or trailing marker 104. The event dart could even be surrounded with a bright highlight 106. Any of these features could be enhanced in order to further attract the user's attention. The appearance of the event dart could take any desired form, such as a user-defined graphical icon or even an alphanumeric character.

Figure 22:
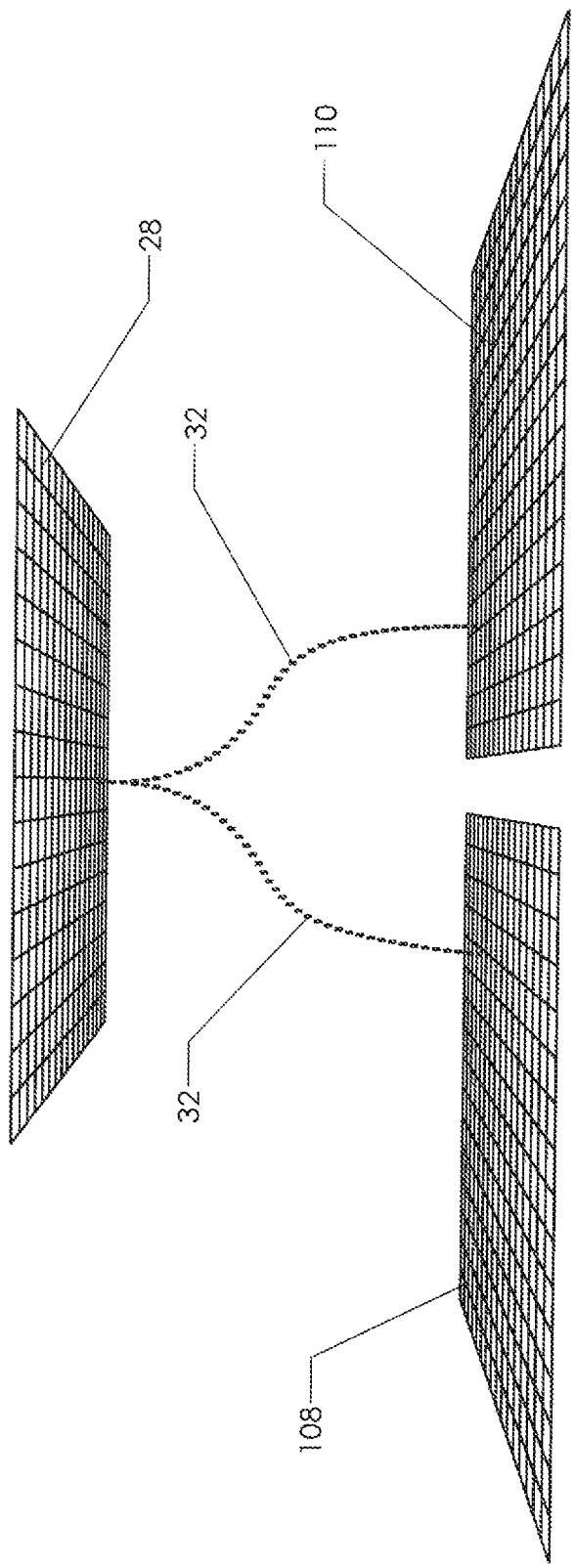
FIG. 22 shows an alternate embodiment with multiple destination maps.

It may also be desirable to subdivide the source and destination addresses according to user-selected criteria. One way to do this is to simply allow the user to establish defined regions within the maps. The maps could be plotted according to these regions instead of by plotting the IPv4 addresses. Thus, the user could define a block of "blacklist" addresses, a block of "cooperative" addresses etc. One could also provide the ability to divide the maps into two or more separate pieces. FIG. 22 shows an embodiment in which source map 28 is unchanged but the destination map has been split into two pieces—selected destination map 108 and non-selected destination map 110.

Figure 23:
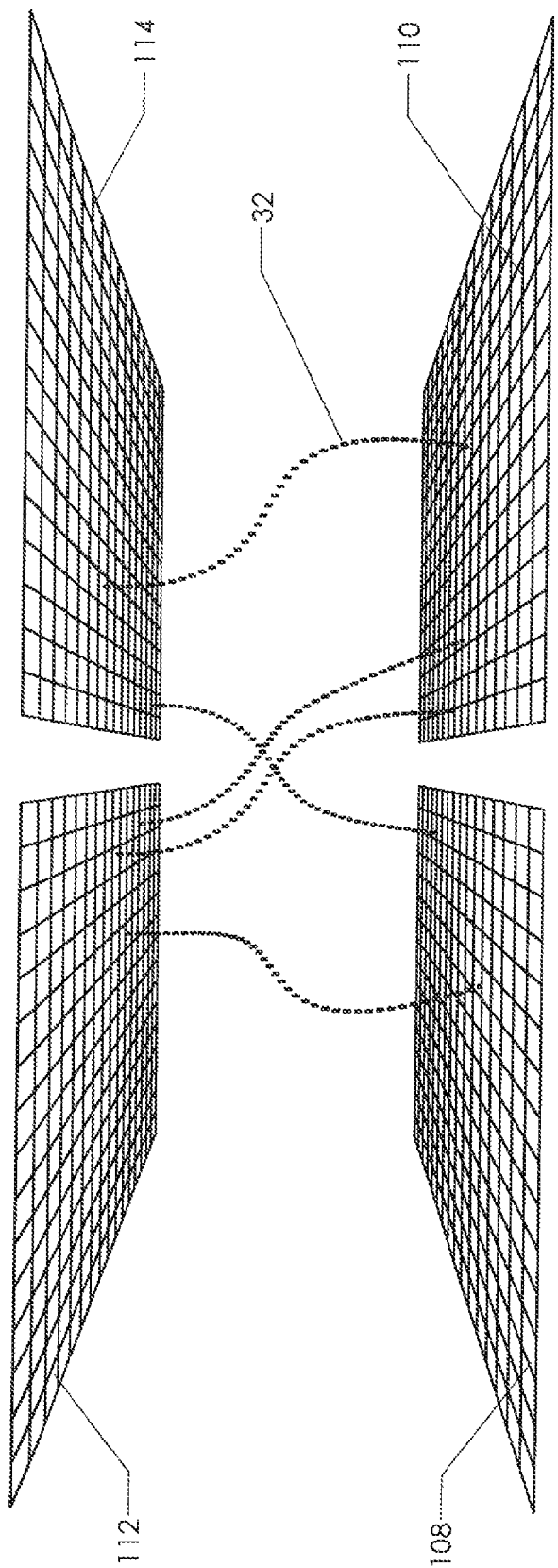
FIG. 23 shows an alternate embodiment in which there are multiple source maps and destination maps.

An analyst might define the selected destination map 108 as a map of the network addresses within his or her area of concern. The non-selected map could simply be defined as "everywhere else." FIG. 23 shows another embodiment in which both the source and destination addresses have been split. The source map has been split into selected source map 112 and non-selected source map 114. Selected source map 112 might be a map of known "blacklist" addresses with non-selected source map 114 being all other addresses. Dart paths 32 would then be depicted as flowing to selected destination map 108 and non-selected destination map 110.

Figure 24:
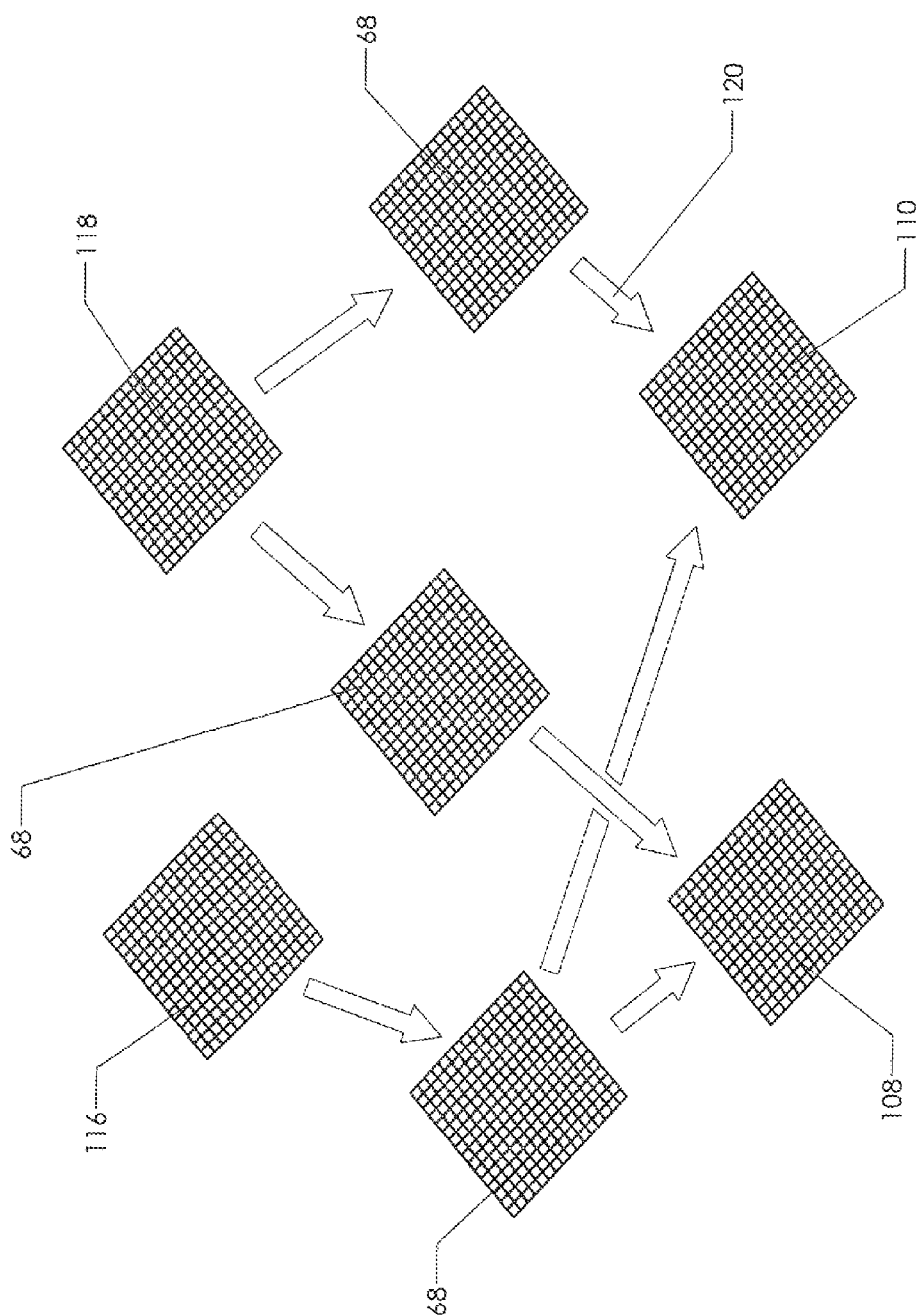
FIG. 24 shows a depiction of a "global" user interface allowing a user to select among available depictions of communication events.

The ability to split the source and destination maps adds a level of complexity to the user interface. It might therefore be desirable to provide an "overall" picture of the communication event and allow the user to select more details by providing a layered interface. FIG. 24 provides one possible depiction of such an interface. FIG. 24 shows an "overall view" of data from selected and non-selected sources flowing to selected and non-selected destinations. Another layer of complexity has been added by providing one or more first feature planes 68 (The reader will recall that a feature plane can project two variables such as message size and event duration).

Flow indicators 120 are added to depict the possible communication events available in the environment depicted. If the user selects a particular flow indicator, the user will then be shown only two planes and the communication events flowing therebetween. As an example, if the user selects the flow indicator in the upper left of FIG. 24, only blacklist source map 116 and first feature plane 68 would be shown (with the event darts moving therebetween). The user is preferably given the ability to select multiple flow direction indicators so that event darts flowing from a selected source through the first feature plane to a selected destination map could all be shown.

The graphical interface shown in FIG. 24 could extend to two, three, or more levels. The user would be allowed to select deeper and deeper levels that would correspond to greater and greater detail.

The use of detailed depictions as presented does present the risk of visual clutter. It is therefore preferable to allow the user to selectively turn on and off some of the available data. Some of the depictions could be grouped together in "layers" (as are typically used in computer aided design software) so that the user could easily control groups of related features.

Another addition is the use of pop-up menus. If, for example, the user moves a mouse pointer to dart path 32 shown in FIG. 15, a window could automatically pop up. The window could provide the source address, the destination address, and other known data describing the particular communication event. Numerous other features could be added to the user interface.

The PC3O concept can be extended to any number of surfaces (preferably planes). Because the data are shown in planar form, combinations of features may be displayed in two dimensions (packet size versus packets per second). In this way, each plane contributes to the understanding of the network situation. The flows can even be routed by Boolean operators into one of multiple planes, allowing analysts to visually separate the interesting characteristics of the data from the mundane. By building visual separation into the display the analyst gains comparative information (such as the proportion of threats going to energy sector versus financial sector) and correlative information (such as comparing untagged flows to tagged flows).

Analysts are allowed to construct customized depictions that separate and characterize the flows. The formulation of a whole series of hypotheses may therefore be made. Useful configurations may be saved for selective future recall.

An example of a user exploring a line of inquiry may be helpful. Consider a network analyst who is investigating a series of attacks on port 20000 to the critical infrastructure of electrical power plants. Concerned that some attackers may have been missed in the initial report, the analyst widens the search to include flows using SCADA related protocols (protocols related to the control of industrial equipment) originating from a larger geographical area and using not only port 20000 but also neighboring ports of significance to SCADA systems. The analyst uses PC3O to define a first plane that plots the use of SCADA protocols on all related ports for the large geographical region.

Having discovered some previously-unrecognized attackers in this way, the analyst creates a second vertical layer in order to answer the question of whether a particular regional utility company is the sole target of the attack, or whether a second utility in the same region is also being threatened. The new layer consists of two planes, one of which captures flows going to portions of the IP space corresponding to one regional utility company and the second of which captures flows going to portions of the IP space used by a second company.

Having found out that attacks are targeting all power utilities in the region, and not just one particular supplier, the analyst now considers who should be advised of the situation. The analyst then constructs a third layer, consisting of two geographical planes that capture the physical locations of the plants under attack. P3CO enables the analyst to determine that in the case of the first plant, only the supervisor for a small region need be notified, while in the case of the second utility a much larger region should be put on alert.

The use of software agents is a desirable feature in the present invention, and so these will now be discussed in some detail. In monitoring complex and fast-paced events it is impossible for a human operator to identify every anomaly in a system as vast and complex as the Internet. Software agents are used to automatically assist the operator. In the case of the Flow Capacitor embodiment, agents collect, aggregate, correlate, analyze, and enrich the raw NetFlow records with information about possible attacks and other potentially malicious behavior that can be used by the display to tag or otherwise visually highlight certain flows to make them easy to spot. The agents are preferably able to learn so that a pattern which an analyst previously identified as being consistent with a cyber attack can be automatically tagged in the future. Users can also direct and redirect the activities of agents in order to ensure their efforts are effective and are focused on useful tasks.

One function for the agents is the aforementioned visual annotation of the display in real time. In the Flow Capacitor, flags are added to the darts. A flag color can be selected to indicate things such as the type of attack, the fact that the flow originated from a blacklisted source, and so forth. In this way, the Flow Capacitor acts as a mediating representation—meaning that it is a highly-communicative visualization tool which can be simultaneously used by mixed groups of people and software agents in order to come to a common understanding of a situation.

Agents may be organized hierarchically to facilitate the enrichment of NetFlow records at multiple levels. The agent annotations do not simply highlight indicators of threat behavior but can also identify the type of threat. For instance, instead of requiring the analyst to notice that a configuration of connecting flow paths (some of which may be lost in a much larger group of flow paths) indicates a distributed port scan, agents working on abstracted data semantics can directly indicate the source of the attack.

As another example, if a message stands out because it is sending oversized packets to a port associated with an SQL (Structured Query Language) database, higher-level agents can abstract that message and tag it as a possible SQL injection attack. The agent-based analytics reduce the perception and reasoning requirements imposed on the human operator.

The agents have been primarily discussed in terms of altering the visual tool—such as highlighting the flow paths associated with an SQL injection attack while dimming the other flow paths. However, the agents may also be configured to be proactive so that they may automatically take interdictory actions.

The agents have other beneficial features, including:

1. Freeing up time. Agents promote continuity in investigation by continuing to function when the analysts are not on station. The agents can also perform tedious, distracting, and fast-paced chores. For example, not only can the agents continuously tag real-time flows, they can also work in the background to discover higher-level patterns.

2. Increasing resilience. Agents can increase system resilience by giving advance warning of network problems.

3. Learning. Agents can augment human pattern recognition by learning new threat patterns and presenting them to the analyst for validation. For example, in order to identify additional attacks and targets the analyst may have missed, a group of attacking flows and their targets could be selected manually by the operator and identified to the software agent in a "learning mode." The agent could then automatically search for other similar patterns. The agents can even anticipate future attacks by identifying nodes which are similar to prior target nodes, but which have not yet been attacked.

4. Making connections. Agents can automatically seek to identify relationships between items of data, people, and groups.

5. Intelligent reporting. Agents can provide real-time advisories and warnings. For instance, under the previously discussed power plant attack scenario, a software agent could automatically notify plants which it believes are likely future targets of the attack.

6. Dynamic scalability. Agents enhance system scalability to highly-distributed and changeable computing architectures. Adapting the visual model to a new type of threat can be as simple as plugging in a new type of software agent. The agents also allow the system to be layered. A highest-level display might only show significant ongoing attacks, while lower level displays could show all traffic existing on a subset of the Internet.

It is preferable that the agents have the ability to immediately respond to human redirection. In other words, they run automatically but a human user may correct their operations and in fact "teach" the agent about a mistake so that it can modify its future behavior. The "playback" functions of an embodiment such as the Flow Capacitor are particularly useful in this regard. The human operator can retrieve a stored sequence and use it to instruct the software agent as to what the agent should be looking for.

Software agents used in the present invention may be located within the operating environment or the host. It is also possible to allow an agent to move back and forth between the operating environment and the host and conditions dictate. One advantage of employing remotely-located software agents is that they can filter the information and only forward that which the system needs.

The PC3O embodiments have been described primarily with respect to network communication events. However, those skilled in the art will realize that the same visual depiction techniques could be used to describe many different types of events. One additional example would be the depiction of package transfer events within a package delivery network. Such a network includes a map of potential source addresses and a map of potential delivery addresses. Information is available regarding the progress of a package from a particular source to a particular destination.

Information may also be available regarding the grouping of packaging at routing centers, the particular method of delivery, and so forth. These attributes are analogous to the attributes described for network communication events. Thus, the methods disclosed could properly be said to apply to "events" with "communication events" within a computer network being one example. Many of the terms used to describe the particular computer network embodiments should likewise be expanded.

For example, the term "NetFlow dart path" in the context of a computer network data flow would more properly be known as a "delivery dart path" in the context of a package delivery network. An "event attribute" would be any attribute of a particular event (such as a package delivery event including information regarding the actual means of delivery).

The invention may therefore generally be described as providing a visualization tool for displaying events that have identifiable properties. The invention will generally be applied to events that occur in the time domain (such as a transmission from a sender to a receiver). It is particularly well suited to displaying a large number of events. The user is given graphical tools that allow the intuitive identification of specific subsets of events and relationships among events.

For every event there would be event attributes that the present invention could visually present. The following table presents several different applications for the proposed invention, with representative event attributes being listed as well:

TABLE TWO

| Event Category | Event Type | Event Attributes |
|---|---|---|
| Communications | Point-to-point Broadcast | time, duration, source ID, destination ID, source location, destination location, message size, tags |
| | Netflow | time, duration, source ID, destination ID, source location, destination location, message size, tags protocol, source port, destination port, route |
| | Phone call | time, duration, caller number, receiver number, caller ID, receiver ID, caller/receiver carrier, caller/receiver locations |
| | Text message | time, caller number, receiver number, caller ID, receiver ID, caller/receiver carrier, caller/receiver locations |
| | Email | time, size, source address, destination address, attachments |
| | Voice/video Chat | time, duration, caller address, receiver address, caller ID, receiver name |
| | Twitter tweet | time, sender ID and location, size follower ID's and locations |
| | Facebook events | status update, message, post picture/video |
| Delivery events | Mail services | pick-up time, delivery time, duration in route, routing, sender address, receiver address, quantity, weight, size |
| | Disaster relief | donor ID, donor location, recipient ID, recipient location, loading time, delivery time, earner, weight, size |
| Financial transactions | Purchase | time, location, buyer, seller, price, quantity, clearing agent |
| | Stock trade | buyer, seller, price, number of shares, broker ID |
| World events | Epidemiology | case reporting time, reporting location, disease type, victim status, ultimate case outcome, contacts with others, contact locations |
| | Crime | crime event time, location, victim ID, perpetrator ID, case outcome |
| | Disasters | cause of damage, type of damage, functional status, sources of help, resource levels, critical needs |

The invention is not limited to any of the particular embodiments described or listed herein. Those skilled in the art will undoubtedly envision applications beyond those that have been describe. Thus, the scope of the invention should be fixed by the following claims, rather than by the examples given.

Having described our invention, we claim:

1. A method for visually depicting events, comprising:
   a. providing a computer, said computer being connected to a computer display;
   b. providing display software running on at least one computer, including said computer;
   c. providing a set of information describing said events to said display software, said information including source identifying information and destination identifying information for each of said events;
   d. using said display software to create a source map, said source map being projected as a first surface on said computer display;
   e. using said display software to create a destination map, said destination map being projected as a second surface on said computer display;
   f. using said software to map each of said events to said source map using said source identifying information associated with said event;

g. using said software to map each of said events to said destination map using said destination identifying information associated with said event;

h. using said display software to graphically depict said second surface as being separated in space from said first surface on said computer display; and i. using said display software to depict said events on said computer display as event paths flowing from said first surface to said second surface, with each of said event paths originating at a source address on said first surface and terminating at a destination address on said second surface, and with said separation between said first and second surfaces representing a value selected from the group consisting of time and distance.

2. A method for depicting events as recited in claim 1, further comprising using said display software to project said destination map as a mirror image of said source map.

3. A method for depicting events as recited in claim 1, further comprising using said display software to add apparent perspective to the depiction of said source and destination maps.

4. A method for depicting events as recited in claim 1, wherein each of said event paths includes a plurality of event darts moving along said event path, with each event dart corresponding to a single event within said set of information.

5. A method for depicting events as recited in claim 1, wherein:
 a. each of said events is a communication event; and
 b. said event path moves away from said first surface and toward said second surface as time elapses from a time at which said communication event commences at a source address on said first surface.

6. A method for depicting events as recited in claim 4, wherein said separation between said first and second surfaces represents the passage of time, and wherein each event dart moves from said first surface and toward said second surface as time elapses from a time at which said event began.

7. A method for depicting events as recited in claim 6, wherein said events are network data flows and wherein a length of each event dart is proportional to a size of said data flow said event dart represents.

8. A method for depicting events as recited in claim 1, wherein:
 a. said first surface includes a graduated color display; and
 b. said second surface includes a graduated color display.

9. A method for depicting events as recited in claim 4, wherein:
 a. said first surface includes a graduated color display; and
 b. said second surface includes a graduated color display.

10. A method for depicting events as recited in claim 9, wherein each of said event darts is divided into a first half and a second half, with a color of said first half corresponding to a color of said first surface at said source address and a color of said second half corresponding to a color of said second surface at said destination address.

11. A method for depicting events as recited in claim 1, further comprising:
 a. depicting at least one feature plane between said first and second planes;
 b. wherein said information includes at least one parameter in addition to said source identifying information and said destination identifying information;
 c. mapping said at least one parameter to said at least one feature plane; and
 d. displaying said dart paths as passing through said at least one feature plane.

12. A method for depicting events as recited in claim 1, further comprising:
 a. depicting at least one ring between said first and second planes;
 b. wherein said information includes at least one parameter in addition to said source address and said destination address;
 c. selecting a value for said at least one parameter corresponding to said at least one ring; and
 d. displaying those event paths having a value for said at least one parameter which corresponds to said value selected for said at least one ring as passing through said at least one ring.

13. A method for depicting events as recited in claim 1, wherein said source map and said destination map are referenced to geographic features.

14. A method for depicting events as recited in claim 1, wherein said computer display can be reoriented, panned, and zoomed.

15. A method for depicting events as recited in claim 1, comprising:
 a. wherein said set of information describes data flows on a computer network to said display software, said information including a source address and a destination address for each of said data flows;
 b. using said display software to display a plurality of possible source addresses on a source map, said source map being projected as a first surface on said display;
 c. using said display software to display a plurality of possible destination addresses on a destination map, said destination map being projected as a second surface on said display;
 d. using said display software to graphically depict said second surface as being separated in space from said first surface on said computer display; and
 e. using said display software to graphically depict said set of information on said computer display as dart paths flowing from said first surface to said second surface, with each of said dart paths originating at a source address on said first surface and terminating at a destination address on said second surface.

16. A method for depicting network data flows as recited in claim 15, further comprising using said display software to project said destination map as a transformation of said source map.

17. A method for depicting network data flow as recited in claim 15, further comprising using said display software to add apparent perspective to the depiction of said source and destination maps.

18. A method for depicting network data flow as recited in claim 15, wherein each of said dart paths includes a plurality of event darts moving along said dart path, with each flow dart corresponding to a single data flow within said set of information.

19. A method for depicting network data flow as recited in claim 15, wherein said separation between said first and second surfaces represents the passage of time, and wherein said dart path moves away from said first surface and toward said second surface as time elapses from a time at which a dart path commences at a source address on said first surface.

20. A method for depicting network data flow as recited in claim 18, wherein said separation between said first and second surfaces represents the passage of time, and wherein each event dart moves from said first surface and toward said second surface as time elapses from a time at which said data flow on which said event dart is based left said source address for said data flow.

21. A method for depicting network data flow as recited in claim 20, wherein a length of each event dart is proportional to a size of said data flow said event dart represents.

22. A method for depicting network data flow as recited in claim 15, wherein:
   a. said first surface includes a graduated color display; and
   b. said second surface includes a graduated color display.

23. A method for depicting network data flow as recited in claim 18, wherein:
   a. said first surface includes a graduated color display; and
   b. said second surface includes a graduated color display.

24. A method for depicting network data flow as recited in claim 23, wherein each of said event darts is divided into a first half and a second half, with a color of said first half corresponding to a color of said first surface at said source address and a color of said second half corresponding to a color of said second surface at said destination address.

25. A method for depicting network data flow as recited in claim 15, further comprising:
   a. depicting at least one feature plane between said first and second planes;
   b. wherein said information includes at least one parameter in addition to said source address and said destination address;
   c. mapping said at least one parameter to said at least one feature plane; and
   d. displaying said dart paths as passing through said at least one feature plane.

26. A method for depicting network data flow as recited in claim 15, further comprising:
   a. depicting at least one ring between said first and second planes;
   b. wherein said information includes at least one parameter in addition to said source address and said destination address;
   c. selecting a value for said at least one parameter corresponding to said at least one ring; and
   d. displaying those dart paths having a value for said at least one parameter which corresponds to said value selected for said at least one ring as passing through said at least one ring.

27. A method for depicting network data flow as recited in claim 15, wherein said source map and said destination map are referenced to geographic features.

28. A method for depicting network data flow as recited in claim 15, wherein said computer display can be reoriented, panned, and zoomed.

29. A method for depicting network events as recited in claim 4, wherein at least one of said event darts is given a highlighting element.

30. A method for depicting network events as recited in claim 18, wherein at least one of said event darts is given a highlighting element.

* * * * *